United States Patent [19]
Kobayashi et al.

[11] Patent Number: 5,841,743
[45] Date of Patent: Nov. 24, 1998

[54] OPTICAL DISK CHANGER SYSTEM AND METHOD OF MANAGING OPTICAL DISK CHANGER

[75] Inventors: Susumu Kobayashi, Osakashi; Masaya Miyazaki, Ikedashi; Masaki Horiuchi, Hirakatashi, all of Japan

[73] Assignee: Matsushita Electric Industrial Co., Ltd., Japan

[21] Appl. No.: 825,019

[22] Filed: Mar. 26, 1997

[30]   Foreign Application Priority Data

Mar. 29, 1996 [JP] Japan ................................. 8-077010
Sep. 20, 1996 [JP] Japan ................................. 8-249489

[51] Int. Cl.$^6$ .............................................. G11B 17/22
[52] U.S. Cl. ......................................................... 369/34
[58] Field of Search ............................... 369/30, 33, 34, 369/36, 37, 38, 178

[56]   References Cited

U.S. PATENT DOCUMENTS

| | | | |
|---|---|---|---|
| 5,467,326 | 11/1995 | Miyashita et al. | 369/30 |
| 5,546,315 | 8/1996 | Kleinschnitz | 369/34 |
| 5,644,558 | 7/1997 | Inatani et al. | 369/30 |
| 5,699,329 | 12/1997 | Hisamatsu et al. | 369/30 |

FOREIGN PATENT DOCUMENTS 613 143 A2  8/1994  European Pat. Off. .
717 405 A2  6/1996  European Pat. Off. .

OTHER PUBLICATIONS

Patent Abstract of Japan, vol. 95, No. 007, Aug. 31, 1995 & JP 07 093110 A (Toshiba Corp.) Apr. 7, 1995 abstract.
Patent Abstracts of Japan, vol. 96, No. 09, Sep. 30, 1996 & JP 08 138355 A (Canon Inc.) abstract.

*Primary Examiner*—Tan Dinh
*Attorney, Agent, or Firm*—Parkhurst & Wendel, L.L.P

[57]   ABSTRACT

An optical disk changer system including an optical disk changer with magazines for storage. The disk changer can insert/draw optical disks in each magazine and manages data on a set of optical disks singularly, or by a plurality of optical disks, as a volume having a series of logical addresses. Volume management means identifies unused magazines storing unused optical disks. Volume creation information means receives data on the number of optical disks or magazines required to create the volume. Volume creation management means allows identification of the storage position information of unused optical disks to create a volume including optical disks from the volume creation information input means.

25 Claims, 37 Drawing Sheets

FIG. 3

| | | | STORAGE POSITION |
|---|---|---|---|
| MAGAZINE SLOT NUMBER 1 | NO MAGAZINE | | 0 |
| | VOLUME AA | 5 | 10 |
| MAGAZINE SLOT NUMBER 2 | UNUSED | 5 | |
| | VOLUME AA | 4 | 20 |
| MAGAZINE SLOT NUMBER 3 | VOLUME BB | 6 | |
| | VOLUME BB | 4 | 30 |
| MAGAZINE SLOT NUMBER 4 | UNUSED | 6 | |
| | VOLUME CC | 10 | 40 |
| MAGAZINE SLOT NUMBER 5 | | | |
| | VOLUME CC | 10 | 50 |
| MAGAZINE SLOT NUMBER 6 | | | |
| | UNUSED | 10 | 60 |
| MAGAZINE SLOT NUMBER 7 | | | |
| | UNUSED | 10 | 70 |
| MAGAZINE SLOT NUMBER 8 | | | |
| | VOLUME AA | 5 | 80 |
| MAGAZINE SLOT NUMBER 9 | UNUSED | 5 | |
| | NO MAGAZINE | | 90 |
| MAGAZINE SLOT NUMBER 10 | | | 99 |

FIG. 10

| STORAGE POSITION | VOLUME NAME | STORAGE POSITION | VOLUME NAME | STORAGE POSITION | VOLUME NAME | STORAGE POSITION | VOLUME NAME |
|---|---|---|---|---|---|---|---|
| 0 | NO MAGAZINE | 25 | BB | 50 | CC | 75 | UNUSED |
| 1 | NO MAGAZINE | 26 | BB | 51 | CC | 76 | UNUSED |
| 2 | NO MAGAZINE | 27 | BB | 52 | CC | 77 | UNUSED |
| 3 | NO MAGAZINE | 28 | BB | 53 | CC | 78 | UNUSED |
| 4 | NO MAGAZINE | 29 | BB | 54 | CC | 79 | UNUSED |
| 5 | NO MAGAZINE | 30 | BB | 55 | CC | 80 | AA |
| 6 | NO MAGAZINE | 31 | BB | 56 | CC | 81 | AA |
| 7 | NO MAGAZINE | 32 | BB | 57 | CC | 82 | AA |
| 8 | NO MAGAZINE | 33 | BB | 58 | CC | 83 | AA |
| 9 | NO MAGAZINE | 34 | UNUSED | 59 | CC | 84 | AA |
| 10 | AA | 35 | UNUSED | 60 | UNUSED | 85 | UNUSED |
| 11 | AA | 36 | UNUSED | 61 | UNUSED | 86 | UNUSED |
| 12 | AA | 37 | UNUSED | 62 | UNUSED | 87 | UNUSED |
| 13 | AA | 38 | UNUSED | 63 | UNUSED | 88 | UNUSED |
| 14 | AA | 39 | UNUSED | 64 | UNUSED | 89 | UNUSED |
| 15 | UNUSED | 40 | CC | 65 | UNUSED | 90 | NO MAGAZINE |
| 16 | UNUSED | 41 | CC | 66 | UNUSED | 91 | NO MAGAZINE |
| 17 | UNUSED | 42 | CC | 67 | UNUSED | 92 | NO MAGAZINE |
| 18 | UNUSED | 43 | CC | 68 | UNUSED | 93 | NO MAGAZINE |
| 19 | UNUSED | 44 | CC | 69 | UNUSED | 94 | NO MAGAZINE |
| 20 | AA | 45 | CC | 70 | UNUSED | 95 | NO MAGAZINE |
| 21 | AA | 46 | CC | 71 | UNUSED | 96 | NO MAGAZINE |
| 22 | AA | 47 | CC | 72 | UNUSED | 97 | NO MAGAZINE |
| 23 | AA | 48 | CC | 73 | UNUSED | 98 | NO MAGAZINE |
| 24 | BB | 49 | CC | 74 | UNUSED | 99 | NO MAGAZINE |

FIG. 11

| SLOT NUMBER | PRESENSE OF MAGAZINE | NUMBER OF UNUSED OPTICAL DISK | STORAGE POSITION | UNUSED MAGAZINE |
|---|---|---|---|---|
| 0 | X | 0 | | X |
| 1 | O | 5 | 15,16,17,18,19 | X |
| 2 | O | 0 | | X |
| 3 | O | 6 | 34,35,36,37,38,39 | X |
| 4 | O | 0 | | X |
| 5 | O | 0 | | X |
| 6 | O | 10 | 60,61,62,63,64,65,66,67,68,69 | O |
| 7 | O | 10 | 70,71,72,73,74,75,76,77,78,79 | O |
| 8 | O | 5 | 85,86,87,88,89 | X |
| 9 | X | 0 | | X |
| TOTAL | 8 | 36 | | 2 |

FIG. 12

| STORAGE POSITION | VOLUME NAME | STORAGE POSITION | VOLUME NAME | STORAGE POSITION | VOLUME NAME | STORAGE POSITION | VOLUME NAME |
|---|---|---|---|---|---|---|---|
| 0 | NO MAGAZINE | 25 | BB | 50 | CC | 75 | UNUSED |
| 1 | NO MAGAZINE | 26 | BB | 51 | CC | 76 | UNUSED |
| 2 | NO MAGAZINE | 27 | BB | 52 | CC | 77 | UNUSED |
| 3 | NO MAGAZINE | 28 | BB | 53 | CC | 78 | UNUSED |
| 4 | NO MAGAZINE | 29 | BB | 54 | CC | 79 | UNUSED |
| 5 | NO MAGAZINE | 30 | BB | 55 | CC | 80 | AA |
| 6 | NO MAGAZINE | 31 | BB | 56 | CC | 81 | AA |
| 7 | NO MAGAZINE | 32 | BB | 57 | CC | 82 | AA |
| 8 | NO MAGAZINE | 33 | BB | 58 | CC | 83 | AA |
| 9 | NO MAGAZINE | 34 | DD | 59 | CC | 84 | AA |
| 10 | AA | 35 | DD | 60 | UNUSED | 85 | UNUSED |
| 11 | AA | 36 | DD | 61 | UNUSED | 86 | UNUSED |
| 12 | AA | 37 | DD | 62 | UNUSED | 87 | UNUSED |
| 13 | AA | 38 | UNUSED | 63 | UNUSED | 88 | UNUSED |
| 14 | AA | 39 | UNUSED | 64 | UNUSED | 89 | UNUSED |
| 15 | DD | 40 | CC | 65 | UNUSED | 90 | NO MAGAZINE |
| 16 | DD | 41 | CC | 66 | UNUSED | 91 | NO MAGAZINE |
| 17 | DD | 42 | CC | 67 | UNUSED | 92 | NO MAGAZINE |
| 18 | DD | 43 | CC | 68 | UNUSED | 93 | NO MAGAZINE |
| 19 | DD | 44 | CC | 69 | UNUSED | 94 | NO MAGAZINE |
| 20 | AA | 45 | CC | 70 | UNUSED | 95 | NO MAGAZINE |
| 21 | AA | 46 | CC | 71 | UNUSED | 96 | NO MAGAZINE |
| 22 | AA | 47 | CC | 72 | UNUSED | 97 | NO MAGAZINE |
| 23 | AA | 48 | CC | 73 | UNUSED | 98 | NO MAGAZINE |
| 24 | BB | 49 | CC | 74 | UNUSED | 99 | NO MAGAZINE |

FIG. 13

| SLOT NUMBER | PRESENSE OF MAGAZINE | NUMBER OF UNUSED OPTICAL DISK | STORAGE POSITION | UNUSED MAGAZINE |
|---|---|---|---|---|
| 0 | X | 0 |  | X |
| 1 | O | 0 |  | X |
| 2 | O | 0 |  | X |
| 3 | O | 2 | 38,39 | X |
| 4 | O | 0 |  | X |
| 5 | O | 0 |  | X |
| 6 | O | 10 | 60,61,62,63,64, 65,66,67,68,69 | O |
| 7 | O | 10 | 70,71,72,73,74, 75,76,77,78,79 | O |
| 8 | O | 5 | 85,86,87,88,89 | X |
| 9 | X | 0 |  | X |
| TOTAL | 8 | 27 |  | 2 |

FIG. 14

| STORAGE POSITION | VOLUME NAME | STORAGE POSITION | VOLUME NAME | STORAGE POSITION | VOLUME NAME | STORAGE POSITION | VOLUME NAME |
|---|---|---|---|---|---|---|---|
| 0 | NO MAGAZINE | 25 | BB | 50 | CC | 75 | UNUSED |
| 1 | NO MAGAZINE | 26 | BB | 51 | CC | 76 | UNUSED |
| 2 | NO MAGAZINE | 27 | BB | 52 | CC | 77 | UNUSED |
| 3 | NO MAGAZINE | 28 | BB | 53 | CC | 78 | UNUSED |
| 4 | NO MAGAZINE | 29 | BB | 54 | CC | 79 | UNUSED |
| 5 | NO MAGAZINE | 30 | BB | 55 | CC | 80 | AA |
| 6 | NO MAGAZINE | 31 | BB | 56 | CC | 81 | AA |
| 7 | NO MAGAZINE | 32 | BB | 57 | CC | 82 | AA |
| 8 | NO MAGAZINE | 33 | BB | 58 | CC | 83 | AA |
| 9 | NO MAGAZINE | 34 | UNUSED | 59 | CC | 84 | AA |
| 10 | AA | 35 | UNUSED | 60 | DD | 85 | UNUSED |
| 11 | AA | 36 | UNUSED | 61 | DD | 86 | UNUSED |
| 12 | AA | 37 | UNUSED | 62 | DD | 87 | UNUSED |
| 13 | AA | 38 | UNUSED | 63 | DD | 88 | UNUSED |
| 14 | AA | 39 | UNUSED | 64 | DD | 89 | UNUSED |
| 15 | UNUSED | 40 | CC | 65 | DD | 90 | NO MAGAZINE |
| 16 | UNUSED | 41 | CC | 66 | DD | 91 | NO MAGAZINE |
| 17 | UNUSED | 42 | CC | 67 | DD | 92 | NO MAGAZINE |
| 18 | UNUSED | 43 | CC | 68 | DD | 93 | NO MAGAZINE |
| 19 | UNUSED | 44 | CC | 69 | DD | 94 | NO MAGAZINE |
| 20 | AA | 45 | CC | 70 | UNUSED | 95 | NO MAGAZINE |
| 21 | AA | 46 | CC | 71 | UNUSED | 96 | NO MAGAZINE |
| 22 | AA | 47 | CC | 72 | UNUSED | 97 | NO MAGAZINE |
| 23 | AA | 48 | CC | 73 | UNUSED | 98 | NO MAGAZINE |
| 24 | BB | 49 | CC | 74 | UNUSED | 99 | NO MAGAZINE |

FIG. 15

| SLOT NUMBER | PRESENSE OF MAGAZINE | NUMBER OF UNUSED OPTICAL DISK | STORAGE POSITION | UNUSED MAGAZINE |
|---|---|---|---|---|
| 0 | X | 0 | | X |
| 1 | O | 5 | 15,16,17,18,19 | X |
| 2 | O | 0 | | X |
| 3 | O | 6 | 34,35,36,37,38,39 | X |
| 4 | O | 0 | | X |
| 5 | O | 0 | | X |
| 6 | O | 0 | | X |
| 7 | O | 10 | 70,71,72,73,74,75,76,77,78,79 | O |
| 8 | O | 5 | 85,86,87,88,89 | X |
| 9 | X | 0 | | X |
| TOTAL | 8 | 26 | | 1 |

FIG. 16

| STORAGE POSITION | VOLUME NAME | STORAGE POSITION | VOLUME NAME | STORAGE POSITION | VOLUME NAME | STORAGE POSITION | VOLUME NAME |
|---|---|---|---|---|---|---|---|
| 0 | NO MAGAZINE | 25 | BB | 50 | CC | 75 | UNUSED |
| 1 | NO MAGAZINE | 26 | BB | 51 | CC | 76 | UNUSED |
| 2 | NO MAGAZINE | 27 | BB | 52 | CC | 77 | UNUSED |
| 3 | NO MAGAZINE | 28 | BB | 53 | CC | 78 | UNUSED |
| 4 | NO MAGAZINE | 29 | BB | 54 | CC | 79 | UNUSED |
| 5 | NO MAGAZINE | 30 | UNUSED | 55 | CC | 80 | AA |
| 6 | NO MAGAZINE | 31 | UNUSED | 56 | CC | 81 | AA |
| 7 | NO MAGAZINE | 32 | UNUSED | 57 | CC | 82 | AA |
| 8 | NO MAGAZINE | 33 | UNUSED | 58 | CC | 83 | AA |
| 9 | NO MAGAZINE | 34 | UNUSED | 59 | CC | 84 | AA |
| 10 | AA | 35 | UNUSED | 60 | UNUSED | 85 | UNUSED |
| 11 | AA | 36 | UNUSED | 61 | UNUSED | 86 | UNUSED |
| 12 | AA | 37 | UNUSED | 62 | UNUSED | 87 | UNUSED |
| 13 | AA | 38 | UNUSED | 63 | UNUSED | 88 | UNUSED |
| 14 | AA | 39 | UNUSED | 64 | UNUSED | 89 | UNUSED |
| 15 | BB | 40 | CC | 65 | UNUSED | 90 | NO MAGAZINE |
| 16 | BB | 41 | CC | 66 | UNUSED | 91 | NO MAGAZINE |
| 17 | BB | 42 | CC | 67 | UNUSED | 92 | NO MAGAZINE |
| 18 | BB | 43 | CC | 68 | UNUSED | 93 | NO MAGAZINE |
| 19 | UNUSED | 44 | CC | 69 | UNUSED | 94 | NO MAGAZINE |
| 20 | AA | 45 | CC | 70 | UNUSED | 95 | NO MAGAZINE |
| 21 | AA | 46 | CC | 71 | UNUSED | 96 | NO MAGAZINE |
| 22 | AA | 47 | CC | 72 | UNUSED | 97 | NO MAGAZINE |
| 23 | AA | 48 | CC | 73 | UNUSED | 98 | NO MAGAZINE |
| 24 | BB | 49 | CC | 74 | UNUSED | 99 | NO MAGAZINE |

FIG. 17

| SLOT NUMBER | PRESENSE OF MAGAZINE | NUMBER OF UNUSED OPTICAL DISK | STORAGE POSITION | UNUSED MAGAZINE |
|---|---|---|---|---|
| 0 | X | 0 | | X |
| 1 | O | 1 | 19 | X |
| 2 | O | 0 | | X |
| 3 | O | 10 | 30,31,32,33,34,35,36,37,38,39 | O |
| 4 | O | 0 | | X |
| 5 | O | 0 | | X |
| 6 | O | 10 | 60,61,62,63,64,65,66,67,68,69 | O |
| 7 | O | 10 | 70,71,72,73,74,75,76,77,78,79 | O |
| 8 | O | 5 | 85,86,87,88,89 | X |
| 9 | X | 0 | | X |
| TOTAL | 8 | 36 | | 3 |

FIG. 18

| STORAGE POSITION | VOLUME NAME | STORAGE POSITION | VOLUME NAME | STORAGE POSITION | VOLUME NAME |
|---|---|---|---|---|---|
| 0 | NO MAGAZINE | 25 | BB | 50 | CC |
| 1 | NO MAGAZINE | 26 | BB | 51 | CC |
| 2 | NO MAGAZINE | 27 | BB | 52 | CC |
| 3 | NO MAGAZINE | 28 | BB | 53 | CC |
| 4 | NO MAGAZINE | 29 | BB | 54 | CC |
| 5 | NO MAGAZINE | 30 | DD | 55 | CC |
| 6 | NO MAGAZINE | 31 | DD | 56 | CC |
| 7 | NO MAGAZINE | 32 | DD | 57 | CC |
| 8 | NO MAGAZINE | 33 | DD | 58 | DD |
| 9 | NO MAGAZINE | 34 | DD | 59 | DD |
| 10 | AA | 35 | DD | 60 | DD |
| 11 | AA | 36 | DD | 61 | DD |
| 12 | AA | 37 | DD | 62 | DD |
| 13 | AA | 38 | DD | 63 | DD |
| 14 | AA | 39 | DD | 64 | DD |
| 15 | BB | 40 | CC | 65 | DD |
| 16 | BB | 41 | CC | 66 | DD |
| 17 | BB | 42 | CC | 67 | DD |
| 18 | BB | 43 | CC | 68 | DD |
| 19 | UNUSED | 44 | CC | 69 | DD |
| 20 | AA | 45 | CC | 70 | DD |
| 21 | AA | 46 | CC | 71 | DD |
| 22 | AA | 47 | CC | 72 | DD |
| 23 | AA | 48 | CC | 73 | DD |
| 24 | BB | 49 | CC | 74 | DD |
| | | | | 75 | DD |
| | | | | 76 | DD |
| | | | | 77 | DD |
| | | | | 78 | DD |
| | | | | 79 | DD |
| | | | | 80 | AA |
| | | | | 81 | AA |
| | | | | 82 | AA |
| | | | | 83 | AA |
| | | | | 84 | AA |
| | | | | 85 | UNUSED |
| | | | | 86 | UNUSED |
| | | | | 87 | UNUSED |
| | | | | 88 | UNUSED |
| | | | | 89 | UNUSED |
| | | | | 90 | NO MAGAZINE |
| | | | | 91 | NO MAGAZINE |
| | | | | 92 | NO MAGAZINE |
| | | | | 93 | NO MAGAZINE |
| | | | | 94 | NO MAGAZINE |
| | | | | 95 | NO MAGAZINE |
| | | | | 96 | NO MAGAZINE |
| | | | | 97 | NO MAGAZINE |
| | | | | 98 | NO MAGAZINE |
| | | | | 99 | NO MAGAZINE |

FIG. 19

| SLOT NUMBER 1401 | PRESENSE OF MAGAZINE 1402 | NUMBER OF UNUSED OPTICAL DISK 1403 | STORAGE POSITION 1404 | UNUSED MAGAZINE 1405 1400 |
|---|---|---|---|---|
| 0 | × | 0 | | × |
| 1 | ○ | 1 | 19 | × |
| 2 | ○ | 0 | | × |
| 3 | ○ | 0 | | × |
| 4 | ○ | 0 | | × |
| 5 | ○ | 0 | | × |
| 6 | ○ | 0 | | × |
| 7 | ○ | 0 | | × |
| 8 | ○ | 5 | 85,86,87,88,89 | × |
| 9 | × | 0 | | × |
| TOTAL | 8 | 6 | | 0 |
| | 1406 | 1407 | | 1408 |

FIG. 20

| STORAGE POSITION | VOLUME NAME | STORAGE POSITION | VOLUME NAME | STORAGE POSITION | VOLUME NAME | STORAGE POSITION | VOLUME NAME |
|---|---|---|---|---|---|---|---|
| 0 | NO MAGAZINE | 25 | BB | 50 | CC | 75 | UNUSED |
| 1 | NO MAGAZINE | 26 | BB | 51 | CC | 76 | UNUSED |
| 2 | NO MAGAZINE | 27 | BB | 52 | CC | 77 | UNUSED |
| 3 | NO MAGAZINE | 28 | BB | 53 | CC | 78 | UNUSED |
| 4 | NO MAGAZINE | 29 | BB | 54 | CC | 79 | UNUSED |
| 5 | NO MAGAZINE | 30 | AA | 55 | CC | 80 | AA |
| 6 | NO MAGAZINE | 31 | AA | 56 | CC | 81 | AA |
| 7 | NO MAGAZINE | 32 | AA | 57 | CC | 82 | AA |
| 8 | NO MAGAZINE | 33 | AA | 58 | CC | 83 | AA |
| 9 | NO MAGAZINE | 34 | UNUSED | 59 | CC | 84 | AA |
| 10 | AA | 35 | UNUSED | 60 | UNUSED | 85 | UNUSED |
| 11 | AA | 36 | UNUSED | 61 | UNUSED | 86 | UNUSED |
| 12 | AA | 37 | UNUSED | 62 | UNUSED | 87 | UNUSED |
| 13 | AA | 38 | UNUSED | 63 | UNUSED | 88 | UNUSED |
| 14 | AA | 39 | UNUSED | 64 | UNUSED | 89 | UNUSED |
| 15 | UNUSED | 40 | CC | 65 | UNUSED | 90 | NO MAGAZINE |
| 16 | UNUSED | 41 | CC | 66 | UNUSED | 91 | NO MAGAZINE |
| 17 | UNUSED | 42 | CC | 67 | UNUSED | 92 | NO MAGAZINE |
| 18 | UNUSED | 43 | CC | 68 | UNUSED | 93 | NO MAGAZINE |
| 19 | UNUSED | 44 | CC | 69 | UNUSED | 94 | NO MAGAZINE |
| 20 | BB | 45 | CC | 70 | UNUSED | 95 | NO MAGAZINE |
| 21 | BB | 46 | CC | 71 | UNUSED | 96 | NO MAGAZINE |
| 22 | BB | 47 | CC | 72 | UNUSED | 97 | NO MAGAZINE |
| 23 | BB | 48 | CC | 73 | UNUSED | 98 | NO MAGAZINE |
| 24 | BB | 49 | CC | 74 | UNUSED | 99 | NO MAGAZINE |

FIG. 21

| STORAGE POSITION | VOLUME NAME | STORAGE POSITION | VOLUME NAME | STORAGE POSITION | VOLUME NAME | STORAGE POSITION | VOLUME NAME |
|---|---|---|---|---|---|---|---|
| 0 | AA | 25 | BB | 50 | CC | 75 | UNUSED |
| 1 | AA | 26 | BB | 51 | CC | 76 | UNUSED |
| 2 | AA | 27 | BB | 52 | CC | 77 | UNUSED |
| 3 | AA | 28 | BB | 53 | CC | 78 | UNUSED |
| 4 | AA | 29 | BB | 54 | CC | 79 | UNUSED |
| 5 | AA | 30 | BB | 55 | CC | 80 | UNINSERTED |
| 6 | AA | 31 | BB | 56 | CC | 81 | UNINSERTED |
| 7 | AA | 32 | BB | 57 | CC | 82 | UNINSERTED |
| 8 | AA | 33 | BB | 58 | CC | 83 | UNINSERTED |
| 9 | AA | 34 | UNUSED | 59 | CC | 84 | UNINSERTED |
| 10 | UNINSERTED | 35 | UNUSED | 60 | UNUSED | 85 | AA |
| 11 | UNINSERTED | 36 | UNUSED | 61 | UNUSED | 86 | AA |
| 12 | UNINSERTED | 37 | UNUSED | 62 | UNUSED | 87 | AA |
| 13 | UNINSERTED | 38 | UNUSED | 63 | UNUSED | 88 | AA |
| 14 | UNINSERTED | 39 | UNUSED | 64 | UNUSED | 89 | AA |
| 15 | UNUSED | 40 | CC | 65 | UNUSED | 90 | AA |
| 16 | UNUSED | 41 | CC | 66 | UNUSED | 91 | AA |
| 17 | UNUSED | 42 | CC | 67 | UNUSED | 92 | AA |
| 18 | UNUSED | 43 | CC | 68 | UNUSED | 93 | AA |
| 19 | UNUSED | 44 | CC | 69 | UNUSED | 94 | UNINSERTED |
| 20 | UNINSERTED | 45 | CC | 70 | UNUSED | 95 | UNINSERTED |
| 21 | UNINSERTED | 46 | CC | 71 | UNUSED | 96 | UNINSERTED |
| 22 | UNINSERTED | 47 | CC | 72 | UNUSED | 97 | UNINSERTED |
| 23 | UNINSERTED | 48 | CC | 73 | UNUSED | 98 | UNINSERTED |
| 24 | BB | 49 | CC | 74 | UNUSED | 99 | UNINSERTED |

FIG. 22

| SLOT NUMBER (1401) | PRESENSE OF MAGAZINE (1402) | NUMBER OF UNUSED OPTICAL DISK (1403) | STORAGE POSITION (1404) | UNUSED MAGAZINE (1405/1400) |
|---|---|---|---|---|
| 0 | ○ | 0 | | × |
| 1 | ○ | 5 | 15,16,17,18,19 | × |
| 2 | ○ | 0 | | × |
| 3 | ○ | 6 | 34,35,36,37,38,39 | × |
| 4 | ○ | 0 | | × |
| 5 | ○ | 0 | | × |
| 6 | ○ | 10 | 60,61,62,63,64,65,66,67,68,69 | ○ |
| 7 | ○ | 10 | 70,71,72,73,74,75,76,77,78,79 | ○ |
| 8 | ○ | 5 | 85,86,87,88,89 | × |
| 9 | ○ | 0 | | × |
| TOTAL | 10 (1406) | 36 (1407) | | 2 (1408) |

FIG. 23

| STORAGE POSITION | VOLUME NAME | STORAGE POSITION | VOLUME NAME | STORAGE POSITION | VOLUME NAME |
|---|---|---|---|---|---|
| 0 | NO MAGAZINE | 25 | AA | 50 | CC |
| 1 | NO MAGAZINE | 26 | AA | 51 | CC |
| 2 | NO MAGAZINE | 27 | AA | 52 | CC |
| 3 | NO MAGAZINE | 28 | AA | 53 | CC |
| 4 | NO MAGAZINE | 29 | UNUSED | 54 | CC |
| 5 | NO MAGAZINE | 30 | UNUSED | 55 | CC |
| 6 | NO MAGAZINE | 31 | UNUSED | 56 | CC |
| 7 | NO MAGAZINE | 32 | UNUSED | 57 | CC |
| 8 | NO MAGAZINE | 33 | UNUSED | 58 | CC |
| 9 | NO MAGAZINE | 34 | UNUSED | 59 | UNUSED |
| 10 | AA | 35 | UNUSED | 60 | UNUSED |
| 11 | AA | 36 | UNUSED | 61 | UNUSED |
| 12 | AA | 37 | UNUSED | 62 | UNUSED |
| 13 | AA | 38 | UNUSED | 63 | UNUSED |
| 14 | AA | 39 | UNUSED | 64 | UNUSED |
| 15 | UNUSED | 40 | CC | 65 | UNUSED |
| 16 | UNUSED | 41 | CC | 66 | UNUSED |
| 17 | UNUSED | 42 | CC | 67 | UNUSED |
| 18 | UNUSED | 43 | CC | 68 | UNUSED |
| 19 | UNUSED | 44 | CC | 69 | UNUSED |
| 20 | AA | 45 | CC | 70 | UNUSED |
| 21 | AA | 46 | CC | 71 | UNUSED |
| 22 | AA | 47 | CC | 72 | UNUSED |
| 23 | AA | 48 | CC | 73 | UNUSED |
| 24 | AA | 49 | CC | 74 | UNUSED |

| STORAGE POSITION | VOLUME NAME |
|---|---|
| 75 | UNUSED |
| 76 | UNUSED |
| 77 | UNUSED |
| 78 | UNUSED |
| 79 | UNUSED |
| 80 | BB |
| 81 | BB |
| 82 | BB |
| 83 | BB |
| 84 | BB |
| 85 | BB |
| 86 | BB |
| 87 | BB |
| 88 | BB |
| 89 | BB |
| 90 | NO MAGAZINE |
| 91 | NO MAGAZINE |
| 92 | NO MAGAZINE |
| 93 | NO MAGAZINE |
| 94 | NO MAGAZINE |
| 95 | NO MAGAZINE |
| 96 | NO MAGAZINE |
| 97 | NO MAGAZINE |
| 98 | NO MAGAZINE |
| 99 | NO MAGAZINE |

FIG. 24

| SLOT NUMBER 1401 | PRESENSE OF MAGAZINE 1402 | NUMBER OF UNUSED OPTICAL DISK 1403 | STORAGE POSITION 1404 | UNUSED MAGAZINE 1405/1400 |
|---|---|---|---|---|
| 0 | X | 0 | | X |
| 1 | O | 0 | | X |
| 2 | O | 1 | 29 | X |
| 3 | O | 10 | 30,32,32,33,34, 35,36,37,38,39 | O |
| 4 | O | 0 | | X |
| 5 | O | 0 | | X |
| 6 | O | 10 | 60,61,62,63,64, 65,66,67,68,69 | O |
| 7 | O | 10 | 70,71,72,73,74, 75,76,77,78,79 | O |
| 8 | O | 5 | 85,86,87,88,89 | X |
| 9 | X | 0 | | X |
| TOTAL | 8 / 1406 | 36 / 1407 | | 3 / 1408 |

FIG. 25

| STORAGE POSITION | VOLUME NAME | STORAGE POSITION | VOLUME NAME | STORAGE POSITION | VOLUME NAME | STORAGE POSITION | VOLUME NAME |
|---|---|---|---|---|---|---|---|
| 0 | NO MAGAZINE | 25 | BB | 50 | CC | 75 | UNUSED |
| 1 | NO MAGAZINE | 26 | BB | 51 | CC | 76 | UNUSED |
| 2 | NO MAGAZINE | 27 | BB | 52 | CC | 77 | UNUSED |
| 3 | NO MAGAZINE | 28 | BB | 53 | CC | 78 | UNUSED |
| 4 | NO MAGAZINE | 29 | BB | 54 | CC | 79 | UNUSED |
| 5 | NO MAGAZINE | 30 | BB | 55 | CC | 80 | AA |
| 6 | NO MAGAZINE | 31 | BB | 56 | CC | 81 | AA |
| 7 | NO MAGAZINE | 32 | BB | 57 | CC | 82 | AA |
| 8 | NO MAGAZINE | 33 | BB | 58 | CC | 83 | AA |
| 9 | NO MAGAZINE | 34 | BB | 59 | CC | 84 | AA |
| 10 | AA | 35 | BB | 60 | UNUSED | 85 | UNUSED |
| 11 | AA | 36 | BB | 61 | UNUSED | 86 | UNUSED |
| 12 | AA | 37 | BB | 62 | UNUSED | 87 | UNUSED |
| 13 | AA | 38 | UNUSED | 63 | UNUSED | 88 | UNUSED |
| 14 | AA | 39 | UNUSED | 64 | UNUSED | 89 | UNUSED |
| 15 | BB | 40 | CC | 65 | UNUSED | 90 | NO MAGAZINE |
| 16 | BB | 41 | CC | 66 | UNUSED | 91 | NO MAGAZINE |
| 17 | BB | 42 | CC | 67 | UNUSED | 92 | NO MAGAZINE |
| 18 | BB | 43 | CC | 68 | UNUSED | 93 | NO MAGAZINE |
| 19 | BB | 44 | CC | 69 | UNUSED | 94 | NO MAGAZINE |
| 20 | AA | 45 | CC | 70 | UNUSED | 95 | NO MAGAZINE |
| 21 | AA | 46 | CC | 71 | UNUSED | 96 | NO MAGAZINE |
| 22 | AA | 47 | CC | 72 | UNUSED | 97 | NO MAGAZINE |
| 23 | AA | 48 | CC | 73 | UNUSED | 98 | NO MAGAZINE |
| 24 | BB | 49 | CC | 74 | UNUSED | 99 | NO MAGAZINE |

FIG. 26

| SLOT NUMBER | PRESENSE OF MAGAZINE | NUMBER OF UNUSED OPTICAL DISK | STORAGE POSITION | UNUSED MAGAZINE |
|---|---|---|---|---|
| 0 | X | 0 |  | X |
| 1 | O | 0 |  | X |
| 2 | O | 0 |  | X |
| 3 | O | 2 | 38,39 | X |
| 4 | O | 0 |  | X |
| 5 | O | 0 |  | X |
| 6 | O | 10 | 60,61,62,63,64, 65,66,67,68,69 | O |
| 7 | O | 10 | 70,71,72,73,74, 75,76,77,78,79 | O |
| 8 | O | 5 | 85,86,87,88,89 | X |
| 9 | X | 0 |  | X |
| TOTAL | 8 | 27 |  | 2 |

FIG. 27

| STORAGE POSITION | VOLUME NAME | STORAGE POSITION | VOLUME NAME | STORAGE POSITION | VOLUME NAME | STORAGE POSITION | VOLUME NAME |
|---|---|---|---|---|---|---|---|
| 0 | NO MAGAZINE | 25 | BB | 50 | CC | 75 | UNUSED |
| 1 | NO MAGAZINE | 26 | BB | 51 | CC | 76 | UNUSED |
| 2 | NO MAGAZINE | 27 | BB | 52 | CC | 77 | UNUSED |
| 3 | NO MAGAZINE | 28 | BB | 53 | CC | 78 | UNUSED |
| 4 | NO MAGAZINE | 29 | BB | 54 | CC | 79 | UNUSED |
| 5 | NO MAGAZINE | 30 | BB | 55 | CC | 80 | AA |
| 6 | NO MAGAZINE | 31 | BB | 56 | CC | 81 | AA |
| 7 | NO MAGAZINE | 32 | BB | 57 | CC | 82 | AA |
| 8 | NO MAGAZINE | 33 | BB | 58 | CC | 83 | AA |
| 9 | NO MAGAZINE | 34 | UNUSED | 59 | CC | 84 | AA |
| 10 | AA | 35 | UNUSED | 60 | CC | 85 | UNUSED |
| 11 | AA | 36 | UNUSED | 61 | CC | 86 | UNUSED |
| 12 | AA | 37 | UNUSED | 62 | CC | 87 | UNUSED |
| 13 | AA | 38 | UNUSED | 63 | CC | 88 | UNUSED |
| 14 | AA | 39 | UNUSED | 64 | CC | 89 | UNUSED |
| 15 | UNUSED | 40 | CC | 65 | CC | 90 | NO MAGAZINE |
| 16 | UNUSED | 41 | CC | 66 | CC | 91 | NO MAGAZINE |
| 17 | UNUSED | 42 | CC | 67 | CC | 92 | NO MAGAZINE |
| 18 | UNUSED | 43 | CC | 68 | CC | 93 | NO MAGAZINE |
| 19 | UNUSED | 44 | CC | 69 | CC | 94 | NO MAGAZINE |
| 20 | AA | 45 | CC | 70 | UNUSED | 95 | NO MAGAZINE |
| 21 | AA | 46 | CC | 71 | UNUSED | 96 | NO MAGAZINE |
| 22 | AA | 47 | CC | 72 | UNUSED | 97 | NO MAGAZINE |
| 23 | AA | 48 | CC | 73 | UNUSED | 98 | NO MAGAZINE |
| 24 | BB | 49 | CC | 74 | UNUSED | 99 | NO MAGAZINE |

FIG. 28

| SLOT NUMBER | PRESENSE OF MAGAZINE | NUMBER OF UNUSED OPTICAL DISK | STORAGE POSITION | UNUSED MAGAZINE |
|---|---|---|---|---|
| 0 | X | 0 | | X |
| 1 | O | 5 | 15,16,17,18,19 | X |
| 2 | O | 0 | | X |
| 3 | O | 6 | 34,35,36,37,38,39 | X |
| 4 | O | 0 | | X |
| 5 | O | 0 | | X |
| 6 | O | 0 | | X |
| 7 | O | 10 | 70,71,72,73,74,75,76,77,78,79 | O |
| 8 | O | 5 | 85,86,87,88,89 | X |
| 9 | X | 0 | | X |
| TOTAL | 8 | 26 | | 1 |

FIG. 29

| STORAGE POSITION | VOLUME NAME | STORAGE POSITION | VOLUME NAME | STORAGE POSITION | VOLUME NAME | STORAGE POSITION | VOLUME NAME |
|---|---|---|---|---|---|---|---|
| 0 | NO MAGAZINE | 25 | BB | 50 | CC | 75 | UNUSED |
| 1 | NO MAGAZINE | 26 | BB | 51 | CC | 76 | UNUSED |
| 2 | NO MAGAZINE | 27 | BB | 52 | CC | 77 | UNUSED |
| 3 | NO MAGAZINE | 28 | BB | 53 | CC | 78 | UNUSED |
| 4 | NO MAGAZINE | 29 | BB | 54 | CC | 79 | UNUSED |
| 5 | NO MAGAZINE | 30 | BB | 55 | CC | 80 | AA |
| 6 | NO MAGAZINE | 31 | BB | 56 | CC | 81 | AA |
| 7 | NO MAGAZINE | 32 | BB | 57 | CC | 82 | AA |
| 8 | NO MAGAZINE | 33 | BB | 58 | CC | 83 | AA |
| 9 | NO MAGAZINE | 34 | BB | 59 | CC | 84 | AA |
| 10 | AA | 35 | BB | 60 | UNUSED | 85 | UNUSED |
| 11 | AA | 36 | BB | 61 | UNUSED | 86 | UNUSED |
| 12 | AA | 37 | BB | 62 | UNUSED | 87 | UNUSED |
| 13 | AA | 38 | BB | 63 | UNUSED | 88 | UNUSED |
| 14 | AA | 39 | BB | 64 | UNUSED | 89 | UNUSED |
| 15 | BB | 40 | CC | 65 | UNUSED | 90 | NO MAGAZINE |
| 16 | BB | 41 | CC | 66 | UNUSED | 91 | NO MAGAZINE |
| 17 | BB | 42 | CC | 67 | UNUSED | 92 | NO MAGAZINE |
| 18 | UNUSED | 43 | CC | 68 | UNUSED | 93 | NO MAGAZINE |
| 19 | UNUSED | 44 | CC | 69 | UNUSED | 94 | NO MAGAZINE |
| 20 | AA | 45 | CC | 70 | UNUSED | 95 | NO MAGAZINE |
| 21 | AA | 46 | CC | 71 | UNUSED | 96 | NO MAGAZINE |
| 22 | AA | 47 | CC | 72 | UNUSED | 97 | NO MAGAZINE |
| 23 | AA | 48 | CC | 73 | UNUSED | 98 | NO MAGAZINE |
| 24 | BB | 49 | CC | 74 | UNUSED | 99 | NO MAGAZINE |

FIG. 30

| SLOT NUMBER (1401) | PRESENCE OF MAGAZINE (1402) | NUMBER OF UNUSED OPTICAL DISK (1403) | STORAGE POSITION (1404) | UNUSED MAGAZINE (1405) |
|---|---|---|---|---|
| 0 | × | 0 | | × |
| 1 | ○ | 2 | 18,19 | × |
| 2 | ○ | 0 | | × |
| 3 | ○ | 0 | | × |
| 4 | ○ | 0 | | × |
| 5 | ○ | 0 | | × |
| 6 | ○ | 10 | 60,61,62,63,64,65,66,67,68,69 | ○ |
| 7 | ○ | 10 | 70,71,72,73,74,75,76,77,78,79 | ○ |
| 8 | ○ | 5 | 85,86,87,88,89 | × |
| 9 | × | 0 | | × |
| TOTAL | 8 (1406) | 27 (1407) | | 2 (1408) |

FIG. 32

| Magazine | Slots | Contents |
|---|---|---|
| MAGAZINE 2101 | 1–10 | UNUSED OPTICAL DISK 2 / VOLUME A 3 / VOLUME B 5 |
| MAGAZINE 2102 | 11–20 | VOLUME B 10 |
| MAGAZINE 2103 | 21–30 | VOLUME B 3 / VOLUME C 7 |
| MAGAZINE 2104 | 31–40 | VOLUME D 10 |
| MAGAZINE 2105 | 41–50 | VOLUME D 10 |
| MAGAZINE 2106 | 51–60 | VOLUME D 8 / UNUSED OPTICAL DISK 2 |
| MAGAZINE 2107 | 61–70 | VOLUME E 6 / VOLUME D 4 |
| MAGAZINE 2108 | 71–80 | VOLUME B 3 / VOLUME C 7 |
| MAGAZINE 2109 | 81–90 | NO MAGAZINE |
| MAGAZINE 2110 | 91–100 | NO MAGAZINE |

FIG. 33a

| Position | Contents |
|---|---|
| MAGAZINE 2101 (1) | VOLUME A 5 |
| (10/11) | VOLUME B 5 |
| MAGAZINE 2102 (20/21) | VOLUME B 10 |
| MAGAZINE 2103 (30/31) | VOLUME B 3 |
| (30/31) | VOLUME C 7 |
| MAGAZINE 2104 (40/41) | VOLUME D 10 |
| MAGAZINE 2105 (50/51) | VOLUME D 10 |
| MAGAZINE 2106 (60/61) | VOLUME D 8 |
| (60/61) | UNUSED OPTICAL DISK 2 |
| MAGAZINE 2107 (70/71) | VOLUME E 6 |
| (70/71) | VOLUME D 4 |
| MAGAZINE 2108 (80/81) | VOLUME B 3 |
| (80/81) | VOLUME C 7 |
| MAGAZINE 2109 (90/91) | NO MAGAZINE |
| MAGAZINE 2110 (100) | NO MAGAZINE |

FIG. 33b

| Position | Contents |
|---|---|
| 1 | UNUSED OPTICAL DISK 1 |
| | VOLUME A 4 |
| 10/11 | VOLUME B 5 |
| 20/21 | VOLUME B 10 |
| 30/31 | VOLUME B 3 |
| | VOLUME C 7 |
| 40/41 | VOLUME D 10 |
| 50/51 | VOLUME D 10 |
| 60/61 | VOLUME D 8 |
| | VOLUME A 1 |
| | UNUSED OPTICAL DISK 1 |
| 70/71 | VOLUME E 6 |
| | VOLUME D 4 |
| 80/81 | VOLUME B 3 |
| | VOLUME C 7 |
| 90/91 | NO MAGAZINE |
| 100 | NO MAGAZINE |

FIG. 34a

| Magazine | Slots | Contents |
|---|---|---|
| MAGAZINE 2101 | 1–10 | VOLUME A  10 |
| MAGAZINE 2102 | 11–20 | VOLUME B  10 |
| MAGAZINE 2103 | 21–30 | VOLUME B  3 / VOLUME C  7 |
| MAGAZINE 2104 | 31–40 | VOLUME D  10 |
| MAGAZINE 2105 | 41–50 | VOLUME D  10 |
| MAGAZINE 2106 | 51–60 | VOLUME D  8 / UNUSED OPTICAL DISK 2 |
| MAGAZINE 2107 | 61–70 | VOLUME E  6 / VOLUME D  4 |
| MAGAZINE 2108 | 71–80 | VOLUME B  3 / VOLUME C  7 |
| MAGAZINE 2109 | 81–90 | NO MAGAZINE |
| MAGAZINE 2110 | 91–100 | NO MAGAZINE |

FIG. 34b

| Slots | Contents |
|---|---|
| 1–10 | UNUSED OPTICAL DISK 1 / VOLUME D  8 / UNUSED OPTICAL DISK 1 |
| 11–20 | VOLUME B  10 |
| 21–30 | VOLUME B  3 / VOLUME C  7 |
| 31–40 | VOLUME D  10 |
| 41–50 | VOLUME D  10 |
| 51–60 | VOLUME A  10 |
| 61–70 | VOLUME E  6 / VOLUME D  4 |
| 71–80 | VOLUME B  3 / VOLUME C  7 |
| 81–90 | NO MAGAZINE |
| 91–100 | NO MAGAZINE |

FIG. 35a

| Slot | MAGAZINE 2101 |
|---|---|
| 1 | UNUSED OPTICAL DISK 1 |
| 10/11 | VOLUME A 9 |
| 20/21 | VOLUME B 10 |
| 30/31 | VOLUME B 3 |
| | VOLUME C 7 |
| 40/41 | VOLUME D 10 |
| 50/51 | VOLUME D 10 |
| 60/61 | VOLUME D 8 |
| | UNUSED OPTICAL DISK 2 |
| 70/71 | VOLUME E 6 |
| 80/81 | VOLUME D 4 |
| | VOLUME B 3 |
| 90/91 | VOLUME C 7 |
| 100 | NO MAGAZINE |
| | NO MAGAZINE |

MAGAZINE 2102, MAGAZINE 2103, MAGAZINE 2104, MAGAZINE 2105, MAGAZINE 2106, MAGAZINE 2107, MAGAZINE 2108, MAGAZINE 2109, MAGAZINE 2110

FIG. 35b

| Slot | |
|---|---|
| | UNUSED OPTICAL DISK 2 |
| 10/11 | VOLUME A 8 |
| 20/21 | VOLUME B 10 |
| 30/31 | VOLUME B 3 |
| | VOLUME C 7 |
| 40/41 | VOLUME D 10 |
| 50/51 | VOLUME D 10 |
| 60/61 | VOLUME D 8 |
| | VOLUME A 1 |
| | UNUSED OPTICAL DISK 1 |
| 70/71 | VOLUME E 6 |
| 80/81 | VOLUME D 4 |
| | VOLUME B 3 |
| 90/91 | VOLUME C 7 |
| 100 | NO MAGAZINE |
| | NO MAGAZINE |

FIG. 36a

| Magazine | Slots | Contents |
|---|---|---|
| MAGAZINE 2101 | 1–10 | VOLUME A  5 |
|  | 11–20 | VOLUME B  5 |
| MAGAZINE 2102 | 21–30 | VOLUME B  10 |
| MAGAZINE 2103 | 31–40 | VOLUME B  3 |
| MAGAZINE 2104 | 41–50 | VOLUME C  7 |
| MAGAZINE 2105 | 51–60 | VOLUME D  10 |
| MAGAZINE 2106 | 61–70 | VOLUME D  10 |
| MAGAZINE 2107 | 71–80 | VOLUME D  8 |
|  | 81–90 | UNUSED OPTICAL DISK 2 |
| MAGAZINE 2108 | 91–100 | VOLUME E  6 |
| MAGAZINE 2109 |  | VOLUME D  4 |
|  |  | VOLUME B  3 |
| MAGAZINE 2110 |  | VOLUME C  7 |
|  |  | NO MAGAZINE |
|  |  | NO MAGAZINE |

FIG. 36b

| Slots | Contents |
|---|---|
| 1 | UNUSED OPTICAL DISK 2 |
| –10 | VOLUME A  3 |
| 11 | VOLUME B  5 |
| –20 | VOLUME B  10 |
| 21–30 | VOLUME B  3 |
| 31–40 | VOLUME C  7 |
| 41–50 | VOLUME D  10 |
| 51–60 | VOLUME D  10 |
| 61–70 | VOLUME D  8 |
| 71–80 | VOLUME A  2 |
| 81–90 | VOLUME E  6 |
| 91–100 | VOLUME D  4 |
|  | VOLUME B  3 |
|  | VOLUME C  7 |
|  | NO MAGAZINE |
|  | NO MAGAZINE |

FIG. 37a

| Range | Contents |
|---|---|
| MAGAZINE 2101 (1–10) | VOLUME A 10 |
| MAGAZINE 2102 (11–20) | VOLUME B 10 |
| MAGAZINE 2103 (21–30) | VOLUME B 3 |
| MAGAZINE 2104 (31–40) | VOLUME C 7 |
| MAGAZINE 2105 (41–50) | VOLUME D 10 |
| MAGAZINE 2106 (51–60) | VOLUME D 10 |
| MAGAZINE 2107 (61–70) | UNUSED OPTICAL DISK 2 / VOLUME D 8 |
| MAGAZINE 2108 (71–80) | VOLUME E 6 / VOLUME D 4 |
| MAGAZINE 2109 (81–90) | VOLUME B 3 |
| MAGAZINE 2110 (91–100) | VOLUME C 7 |

FIG. 37b

| Range | Contents |
|---|---|
| 1–10 | UNUSED OPTICAL DISK 2 / VOLUME D 8 |
| 11–20 | VOLUME B 10 |
| 21–30 | VOLUME B 3 |
| 31–40 | VOLUME C 7 |
| 41–50 | VOLUME D 10 |
| 51–60 | VOLUME D 10 |
| 61–70 | VOLUME A 10 |
| 71–80 | VOLUME E 6 / VOLUME D 4 |
| 81–90 | VOLUME B 3 |
| 91–100 | VOLUME C 7 |
| | NO MAGAZINE |
| | NO MAGAZINE |

FIG. 38(a)

| Magazine | Slot range | Contents |
|---|---|---|
| MAGAZINE 2101 | 1–10 | VOLUME A   10 |
| MAGAZINE 2102 | 11–20 | VOLUME B   10 |
| MAGAZINE 2103 | 21–30 | VOLUME B   3 / VOLUME C   7 |
| MAGAZINE 2104 | 31–40 | VOLUME D   10 |
| MAGAZINE 2105 | 41–50 | VOLUME D   10 |
| MAGAZINE 2106 | 51–60 | VOLUME D   9 / UNUSED OPTICAL DISK   1 |
| MAGAZINE 2107 | 61–70 | VOLUME E   6 / UNUSED OPTICAL DISK   1 / VOLUME D   3 |
| MAGAZINE 2108 | 71–80 | VOLUME B   3 / VOLUME C   7 |
| MAGAZINE 2109 | 81–90 | NO MAGAZINE |
| MAGAZINE 2110 | 91–100 | NO MAGAZINE |

FIG. 38(b)

| Magazine | Slots | Content |
|---|---|---|
| MAGAZINE 2101 | 1–10 | VOLUME A 10 |
| MAGAZINE 2102 | 11–20 | VOLUME B 10 |
| MAGAZINE 2103 | 21–30 | VOLUME B 3 |
| MAGAZINE 2104 | 31–40 | VOLUME C 7 |
| MAGAZINE 2105 | 41–50 | VOLUME D 10 |
| MAGAZINE 2106 | 51–60 | VOLUME D 10 |
| MAGAZINE 2107 | 61–70 | VOLUME D 8 / UNUSED OPTICAL DISK 2 / VOLUME E 6 |
| MAGAZINE 2108 | 71–80 | VOLUME D 4 / VOLUME B 3 |
| MAGAZINE 2109 | 81–90 | VOLUME C 7 / NO MAGAZINE |
| MAGAZINE 2110 | 91–100 | NO MAGAZINE |

FIG. 38C¹

| Slots | Content |
|---|---|
| 1–10 | UNUSED OPTICAL DISK 2 |
| 11–20 | VOLUME D 8 |
| 21–30 | VOLUME B 10 |
| 31–40 | VOLUME B 3 / VOLUME C 7 |
| 41–50 | VOLUME D 10 |
| 51–60 | VOLUME D 10 |
| 61–70 | VOLUME D 10 |
| 71–80 | VOLUME E 6 / VOLUME D 4 |
| 81–90 | VOLUME B 3 / VOLUME C 7 |
| 91–100 | NO MAGAZINE |
| | NO MAGAZINE |

_5,841,743_

OPTICAL DISK CHANGER SYSTEM AND METHOD OF MANAGING OPTICAL DISK CHANGER

FIELD OF THE INVENTION

The present invention relates to an optical disk changer system and, more particularly to an optical disk changer management apparatus which manages an optical disk changer using magazines, in which one or a plurality of optical disks can be managed as a single volume, i.e., in each magazine.

BACKGROUND OF THE INVENTION

As illustrated in FIG. 1(*a*), a prior art optical disk changer system includes an optical disk changer 1000 storing a plurality of optical disks and an optical disk changer management apparatus 1200 managing optical disks in the optical disk changer 1000. In this optical disk changer system, in accordance with control signals from the management apparatus 1200, information can be written/in into or read out/from a prescribed optical disk in the optical disk changer 1000, or storage positions of the optical disks in the optical disk changer 1000 can be changed.

As illustrated in FIG. 1(*b*), the optical disk changer 1000 includes a storage rack 1001 for storing optical disks 1006, an optical disk drive 1002, an inlet/outlet 1003 for inserting/extracting the optical disks 1006, an inlet/outlet 1004 for moving the optical disks 1006 between the optical disk drive 1002, and the storage rack 1001 or the inlet/outlet 1003, and an external interface 1005 for accepting transmission/receipt of data to/from the optical disk drive 1002 and a control instruction of the conveyer 1004.

The optical disks 1006 used in the optical disk changer 1000 are respectively stored one by one in cartridges 1007 for protecting the same from dust, damage, fingerprints or the like, one by one. The optical disk changer 1000 is very large-sized, because it is for storing a plurality of optical disks 1006 stored in the cartridges 1007.

The inlet/outlet 1003 is used for inserting/extracting the optical disks 1006 into/from the optical disk changer 1000 by the cartridges 1007 one by one.

With respect to the optical disk changer system constructed described above, an optical disk changer management apparatus which can manage the plurality of optical disks 1006 stored in the optical disk changer 1000, as a unit, i.e., as a logical volume, is described in Japanese Patent Application No. 7-93110.

A description is given of the optical disk changer management apparatus described above in more detail. The apparatus can manage the plurality of optical disks in the optical disk changer as a volume. In order to realize this, the optical disk changer management apparatus includes a link means which manages the storage position, provided with a first management table which provides a link between storage information of the plurality of optical disks in the optical disk changer and information for managing the plurality of optical disks as a volume and a second management table which provides a link between the storage information of the optical disk and a storage position in the optical disk changer, and a control means which controls production, deletion, addition or change of link information with respect to the first and second tables and instructs control of assignment or change of storage positions of optical disks constituting the volume based on the link information of these two tables.

With the use of the prior art optical disk changer management apparatus, an user can manage a plurality of optical disks, for example ten optical disks in the optical disk changer 1000 as a volume. In other words, the user can assume ten optical disks as an optical disk having a capacity of ten optical disks and can neglect each optical disk in writing/reading data into/from the same.

In the prior art optical disk changer management apparatus having the above-described construction, it is possible to add one or a plurality of optical disks to an existing volume. For example, ten optical disks may be added to the existing volume consisting of ten optical disks in the optical disk changer, to produce a new volume consisting of twenty optical disks in total.

Though the optical disks 1006 are stored in the cartridge 1007 for protecting the same from dust, damage. fingerprints or the like as described above, in recent years, an optical disk changer 1100 which stores a plurality of optical disks 1006 in one magazine has emerged as illustrated in FIG. 2 from the demand for miniaturization of the optical disk changer. In FIG. 2, reference numeral 1100 designates an optical disk changer. The optical disk changer 1100 comprises magazines 1101 for storing ten optical disks at a maximum, magazine slots 1102 for storing ten magazines at a maximum, a conveyer 1104 for moving the optical disks between an optical disk drive 1103 and the magazines 1101, and an external interface 1105 for accepting transmission/receipt of data to/from the optical disk drive 1002 and a control instruction of the conveyer 1004.

Ten optical disks 1006 as a unit used in the optical disk changer 1100 are stored in the magazines 1101 for protecting the same from dust, damage, fingerprints or the like. Since a magazine is smaller than ten cartridges included in the optical disk changer 1000 shown in FIG. 1, it is possible to make the optical disk changer 1100 smaller than the prior art optical disk changer 1000. All optical disks 1006 stored in the magazines 1101 can be inserted/extracted by utilizing the magazine 1101 at a time. Function of creating the volume or adding optical disks to the existing volume is demanded of the optical disk changer 1100 illustrated in FIG. 2.

When a volume consisting of the plurality of optical disks is created in the construction of the optical disk changer 1100 which has insertion/extraction capabilities in each magazine and the optical disk changer management apparatus described above, there arises the following problems.

(1) Assume that a volume consisting of ten optical disks is created. When optical disks are selected to create a volume, irrespective of magazines 1101 (sensing optical disks stored in the magazines 1101 as a unit), optical disks dispersed into ten magazines at its worst would be selected to create a volume. Therefore, when the volume is extracted, ten magazines 1101 must be extracted. In addition, when optical disks consisting another volume is included in the extracted magazines, a volume not desired to be extracted is extracted, resulting in poor management efficiency.

(2) When optical disks are added to increase a capacity in response to the reduced capacity of the existing volume in the construction comprising the optical disk changer 1100 which has insertion/extraction capabilities with the use of the magazines 1101 as illustrated in FIG. 2 and the optical disk changer management apparatus described above, the same problem occurs, leading to dispersion of magazines storing optical disks constituting a volume.

SUMMARY OF THE INVENTION

It is an object of the present invention to provide an optical disk changer apparatus in which optical disks constituting a volume are not dispersed into a plurality of magazines when inserting/extracting optical disks in each magazine, and optical disks to be added for increasing a capacity of the existing volume are not dispersed into a plurality of magazines.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, the optical disk changer system comprises a volume creation information input means which can receive an input of the number of magazines, a volume management means including a management table for identifying unused magazines storing only unused optical disks and identifying storage position information of the unused optical disks stored in the unused magazines, and a volume creation management means which inquires of the volume management means storage position information of the unused optical disks stored in the unused magazines to create the volume. Therefore, the user can create a volume which would be manageable by extracting the same from the optical disk changer in each magazine.

According to a second aspect of the present invention, in the optical disk changer system according to the first aspect, the volume management means finds the number of unused magazines and the movement destination storage position information and movement origin storage position information for gathering unused optical disks into magazines, and the volume creation management means creates a volume after inquiring of the volume management means the movement destination storage position information and the movement origin storage position information to move optical disks, thereby creating necessary unused magazines when the unused magazines for creating the volume are less in number than required. Therefore, the problem that unused magazines are less in number than required with unused optical disks dispersed into a plurality of magazines is avoided. Accordingly, the user can utilize all unused optical disks optimally to create a volume, which would be manageable by extracting the same from the optical disk changer in each magazine, irrespective of arrangement of unused optical disks in the optical disk changer.

According to a third aspect of the present invention, the optical disk changer system comprises a volume creation information input means which can receive an input of the number of optical disks, the volume management means as in the first aspect of the present invention, and a volume creation management means which judges whether the number of optical disks constituting the volume is N×Z (Z: positive integer) or not and inquires of the volume management means the storage position information of the unused optical disks stored in Z pieces of magazines to create the volume when the number is N×Z. Therefore, the user can create a volume which would be manageable by extracting the same from the optical disk changer in each magazine when the user inputs the number X (X:positive integer and a multiple of N) of optical disks as well as when the user inputs the number of magazines to create the volume.

According to a fourth aspect of the present invention, in the optical disk changer system according to the third aspect of the present invention, the volume management means finds the number of unused magazines and the movement destination storage position information and the movement origin storage position information for gathering unused optical disks into magazines, and the volume creation management means performs a series of operations of judging whether the number of optical disks constituting the volume is N×Z or not, inquiring of the volume management means the number of unused magazines to decide whether there are Z pieces of unused magazines or more when the number is N×Z, inquiring of the volume management table the movement destination storage position information and the movement origin storage position information for moving optical disks to create necessary unused magazines, and subsequently to this, creating the volume. Therefore, the problem that unused magazines are less in number than required due to dispersion of unused optical disks into a plurality of magazines is avoided. Further, the user can create a volume which would be manageable by extracting the same from the optical disk changer in each magazine when the user inputs the number of magazines as well as when the user inputs the number X (X:positive integer and X is a multiple of N) of optical disks to create the volume.

According to a fifth aspect of the present invention, the optical disk changer system comprises the volume creation information input means as in the third aspect of the present invention, a volume management means for retrieving storage position information of optical disks constituting the volume, the number of the optical disks, the number of magazines storing the optical disks constituting the volume, movement destination storage position information and movement origin storage position information for gathering the optical disks dispersed into the plurality of magazines into the fewest magazines, and an optical disk relocating means for performing a series of operations of inquiring of the volume management means the number of optical disks constituting each volume and the number of magazines storing the optical disks, identifying a volume consisting of N×Z (Z: positive integer) pieces of optical disks and magazines more than Z, and inquiring of the volume management means movement destination storage position information and movement origin storage position information about the volume to move optical disks constituting the volume to Z pieces of magazines. Therefore, the user can create a volume which would be manageable by extracting the same from the optical disk changer in each magazine without waiting for completion of creation of unused magazines when unused magazines are less in number than required to create the volume.

According to a sixth aspect of the present invention the optical disk changer system comprises a volume name input means for receiving the volume name to extract the volume, a volume management means for retrieving the number of the optical disks constituting the volume and the number of magazines storing the volume, and a volume extraction control means for permitting extraction of the volume when the number of optical disks constituting the volume is N×Z (Z: positive integer) and the optical disks are stored in Z pieces of magazines. Therefore, only a volume consisting of N×Z pieces of optical disks stored in Z magazines can be extracted in each magazine. As a result, extraction of magazines storing optical disks constituting a plurality of volume by mistake is avoided.

According to a seventh aspect of the present invention, in the optical disk changer system according to the sixth aspect of the present invention, the volume management means retrieves the storage position information of optical disks constituting the volume and the number of the optical disks, the number of magazines storing optical disks constituting the volume, and the movement destination storage position information and the movement origin storage position information for gathering Nx (Z:positive integer, Z<L) pieces of optical disks dispersed into L (L: positive integer) magazines into Z pieces of magazines selected among L magazines, and a volume extraction control means permits extraction of the volume in each magazines after inquiring of the volume management means the movement destination storage position information and movement origin storage position information to move optical disks into the Z pieces of magazines, when the number of optical disks is N×Z and the number of magazines is L. Therefore, moving optical disks to magazines is performed only when extraction of the volume is demanded and only optical disks constituting the volume to be extracted are moved. As a result, moving the optical disks can be minimized.

According to an eighth aspect of the present invention, the optical disk changer system comprises an empty magazine inserting means for inserting an empty magazine storing no optical disks, a volume management means for managing a magazine slot in which no magazines are inserted (an empty slot) and optical disk storage position information corresponding to the empty slot, a volume extraction control means for permitting extraction of the volume in each magazine, after demanding an insertion of empty magazines the number of which is equal to that of the fewest magazines required to store the optical disks constituting the volume and moving the optical disks constituting the volume into the empty magazines. Therefore, a volume constituting all arbitrary number of optical disks can be extracted by utilizing the empty magazine.

According to a ninth aspect of the present invention, the optical disk changer system comprises the volume name input means as in the seventh aspect, a volume management means for retrieving the storage position information, and the number of optical disks constituting the volume, the number of magazines storing the optical disks, and the movement destination storage position information and the movement origin storage position information for gathering N×Z pieces of optical disks into specified Z pieces of magazines, and the volume extraction control means as in the seventh aspect. Therefore, optical disks constituting the volume to be extracted can be moved into specified magazines and the user can identify magazines to be extracted with ease.

According to a tenth aspect of the present invention, the optical disk changer system according to the ninth aspect comprises a magazine selecting means for selecting a magazine in the order of taking much time for carrying optical disks to an optical disk drive unit. Therefore, it is highly probable that optical disks in use are stored in the storage position that takes a shorter time to carry the optical disks to the optical disk drive unit, thereby reducing carrier time when the optical disks are carried to the optical disk drive unit. As a result, access time to data stored in the optical disk is reduced.

According to an eleventh aspect of the present invention, the optical disk changer system according to the first aspect of the present invention comprises a volume increase information input means which can receive inputs of the number of magazines and a volume increase management means for inquiring of the volume management means storage position information of unused optical disks stored in unused magazines to increase the volume. Therefore, the volume consisting of N×Z (Z: positive integer) pieces of disks can be an manageable one by extracting the same from the optical disk changer after increasing the volume, by inputting the number of magazines during the increase of the volume.

According to a twelfth aspect of the present invention, the optical disk changer system according to the second aspect comprises the volume increase information input means in the eleventh aspect, and a volume creation management means for increasing the volume, after inquiring of the volume management means the movement destination storage position information and the movement origin storage position information and moving the optical disks to create necessary unused magazines, when the unused magazines for increasing the volume is less in number than required. As a result, the user can utilize all unused optical disks in the optical disk changer system optimally to increase a volume irrespective of arrangement of unused optical disks therein.

According to a thirteenth aspect of the present invention, the optical disk changer system according to the eleventh aspect or the twelfth aspect further comprises a volume management means for selecting unused optical disks stored in magazines storing optical disks constituting the existing volume with priority to output the storage position information to the volume increase management means as optical disk storage position information, when a positive integer X is input from the volume increase information input means as the number of the optical disks. Therefore, addition of a capacity is realized without dispersing the storage positions of the optical disks constituting a volume into magazines storing optical disks constituting another volume.

According to a fourteenth aspect of the present invention, the optical disk changer system according to the first or second aspect comprises an unused magazine information display means for inquiring of the volume management means the number of unused magazines to display the same for creating the volume. The user can select the number of optical disks, or magazines, constituting a volume to be newly created or magazines with ease when creating a volume.

According to a fifteenth aspect of the present invention, the optical disk changer system according to the eleventh or twelfth aspect comprises an unused magazine information display means for inquiring of the volume management means the number of unused magazines to increase the volume. The user can select the number of optical disks or magazines, constituting a volume to be newly created with ease when adding a capacity.

According to a sixteenth aspect of the present invention, the optical disk changer system according to the sixth aspect or seventh aspect comprises a volume information display means for inquiring of the volume management means position information of magazines storing optical disks constituting the volume to display information of magazine positions storing optical disks constituting the volume and whether the volume can be extracted in each magazine or not. Therefore, the user can identify a magazine with ease when the volume is extracted.

According to a seventeenth aspect of the present invention, in the optical disk changer system, an optical disk exchange means checks all optical disks in a backup magazine including the system information storage position and moves unused optical disks required to create optical disks for backup to arbitrary magazines (magazines for exchange) when all optical disks in the backup magazine constitute the same volume to perform exchange of all optical disks between the backup magazine and the magazine for exchange so that unused optical disks are stored in the system information storage position. Therefore, when the optical disks in the backup magazine in the optical disk changer constitute the same volume, backup is performed after exchanging all optical disks in the magazine for backup and all optical disks in the magazine for exchange in such a manner that unused optical disks in the magazine for exchange are stored in the system information storage positions, irrespective of the usage state of the backup magazine.

According to an eighteenth aspect of the present invention, the optical disk changer system according to the seventeenth aspect, provided with a plurality of optical disk changer systems, and in addition to the optical disks for backup exchange means, comprises a system information storage position selecting means for selecting required number of the system information storage positions for creating optical disks for backup among an arbitrary number of system information storage positions in the optical disk changer, which previously stores the optical disks for backup at the selected system information storage positions, and when the system information is to be backed up, the plurality of optical disk changers are operated, to backup the system information to be stored in the optical disk. Therefore, the system information storage positions can be selected among possible system information storage positions in the plurality of optical disk changers, and even when all optical disks in one optical disk changer are in use, backup is performed using optical disks in the system storage positions in another optical disk changer.

According to a nineteenth aspect of the present invention, a method of managing optical disk changer comprises, when an input of the number of magazines is selected, identifying unused magazines storing only unused optical disks, identifying the storage position information of unused optical disks stored in the unused magazines, and creating a volume based on the storage position information of the unused optical disks when inputs of the number of magazines are received. Therefore, the user can create a volume which would be manageable by extracting the same from the optical disk changer in each magazine by inputting the number of magazines to create the volume.

According to a twentieth aspect of the present invention, a method of managing the optical disk changer comprises, when it is identified that the total number of unused optical disks is N×Z (Z: positive integer) and the number of magazines storing the optical disks constituting a volume is larger than Z based on the number of optical disks constituting respective volumes in the optical disk changer and the number of magazines storing optical disks constituting the volume, the optical disks constituting such an identified volume are gathered into Z pieces of magazines based on the movement destination storage position information and the movement origin storage position information of optical disks constituting the identified volume. Therefore, the user can use all unused optical disks optimally to create a volume which would be manageable by extracting the same from the optical disk changer irrespective of arrangement of unused optical disks therein.

BRIEF DESCRIPTION OF THE DRAWINGS

FIG. 3 is a diagram illustrating stales of optical disks and magazines in the optical disk changer according to each embodiment of the present invention.

FIG. 10 is a diagram illustrating a content of a volume management table according to each embodiment of the present invention.

FIG. 11 is a diagram illustrating a content of an unused optical disk management table according to each embodiment.

FIG. 12 is a diagram illustrating a content of changed volume management table according to the embodiment 1 of the present invention.

FIG. 13 is a diagram illustrating a content of changed unused optical disk management table according to the embodiment 1 of the present invention.

FIG. 14 is a diagram illustrating a content of changed volume management table according to the embodiment 1 of the present invention.

FIG. 15 is a diagram illustrating a content of changed unused optical disk management table according to the embodiment 1 of the present invention.

FIG. 16 is a diagram illustrating a content of changed volume management table according to the embodiment 2 of the present invention.

FIG. 17 is a diagram illustrating a content of changed unused optical disk management table in the embodiment 2 of the present invention.

FIG. 18 is a diagram illustrating a content of changed volume management table according to the embodiment 1 of the present invention.

FIG. 19 is a diagram illustrating a content of changed unused optical disk management table according to the embodiment 1 of the present invention.

FIG. 20 is a diagram illustrating a content of changed volume management table according to the embodiments 5, 7 of the present invention.

FIG. 21 is a diagram illustrating a content of changed volume management table according to the embodiment 8 of the present invention.

FIG. 22 is a diagram illustrating a content of changed unused optical disk management table according to the embodiment 8 of the present invention.

FIG. 23 is a diagram illustrating a content of changed volume management table according an embodiment 9 of the present invention.

FIG. 24 is a diagram illustrating a content of changed unused optical disk management table according to an embodiment 9 of the present invention.

FIG. 25 is a diagram illustrating a content of changed volume management table according to an embodiment 11 of the present invention.

FIG. 26 is a diagram illustrating a content of changed unused optical disk management table according to the embodiment of the present invention.

FIG. 27 is a diagram illustrating a content of changed volume management table according to the embodiment 11 of the present invention.

FIG. 28 is a diagram illustrating a content of changed unused optical disk management table according to the embodiment 11 of the present invention.

FIG. 29 is a diagram illustrating a content of changed volume management table according to an embodiment 13 of the present invention.

FIG. 30 is a diagram illustrating a content of changed unused optical disk management table according to the embodiment 13 of the present invention.

FIG. 32 is a diagram illustrating a construction of a volume according to the embodiments 17, 18.

FIG. 33(a) is a diagram illustrating a construction of a volume in the optical disk changer before the optical disk exchange means performs exchange of optical disks in the embodiment 17. FIG. 33(b) is a diagram illustrating a construction of a volume after the optical disk exchange means performs exchange of optical disks in the embodiment 17.

FIG. 34(a) is a diagram illustrating a construction of a volume in the optical disk changer before the optical disk exchange means performs exchange of optical disks in the embodiment 17. FIG. 34(b) is a diagram illustrating a construction of a volume after the optical disk exchange means performs exchange of optical disks in the embodiment 17.

FIG. 35(a) is a diagram illustrating a construction of a volume in the optical disk changer before the optical disk exchange means performs exchange of optical disks in the embodiment 18. FIG. 35(b) is a diagram illustrating a construction of a volume after the optical disk exchange means performs exchange of optical disks in the embodiment 18.

FIG. 36(a) is a diagram illustrating a construction of a volume in the optical disk changer before the optical disk exchange means performs exchange of optical disks in the embodiment 18. FIG. 36(b) is a diagram illustrating a construction of a volume after the optical disk exchange means performs exchange of optical disks in the embodiment 18.

FIG. 37(a) is a diagram illustrating a construction of a volume in the optical disk changer before the optical disk exchange means performs exchange of optical disks in the embodiment 18. FIG. 37(b) is a diagram illustrating a construction of a volume after the optical disk exchange means performs exchange of optical disks in the embodiment 18.

FIG. 38(a) is a diagram illustrating a construction of a volume in the optical disk changer before the optical disk exchange means performs exchange of optical disks in the embodiment 18. FIG. 38(b) is a diagram illustrating a construction of a volume in the optical disk changer while the optical disk exchange means is performing exchange of optical disks in the embodiment 18. FIG. 38(c) is a diagram illustrating a construction of a volume after the optical disk exchange means performs exchange of optical disks in the embodiment 18.

DETAILED DESCRIPTION OF THE PREFERRED EMBODIMENTS

A description is given of FIGS. 3 to 11 illustrating embodiments 1 to 16.

Figure 2:
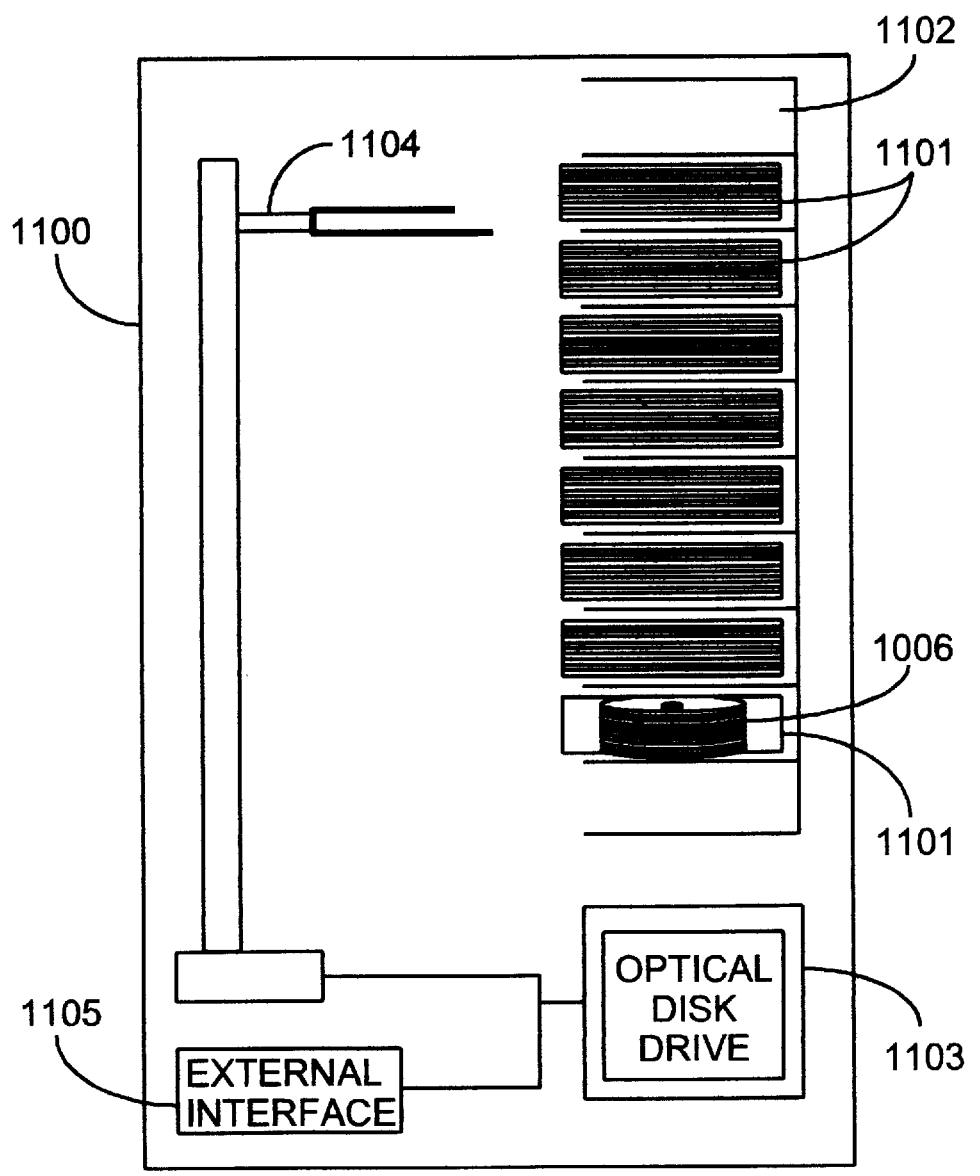
FIG. 2 is a diagram illustrating a construction of an optical disk changer which employs magazines for use in each embodiment according to the present invention.

FIG. 3 illustrates optical disks and magazines in the prior art optical disk changer 1100 illustrated in FIG. 2. As illustrated in FIG. 3, 8 magazine slots (magazine slot number 2–9) of ten magazine slots store magazines where a volume AA consisting of 14 optical disks, a volume BB consisting of ten optical disks, a volume CC consisting of 20 optical disks and 36 unused optical disks. Assume that the state described above is an initial state of the optical disk changer 1100.

Figure 4:
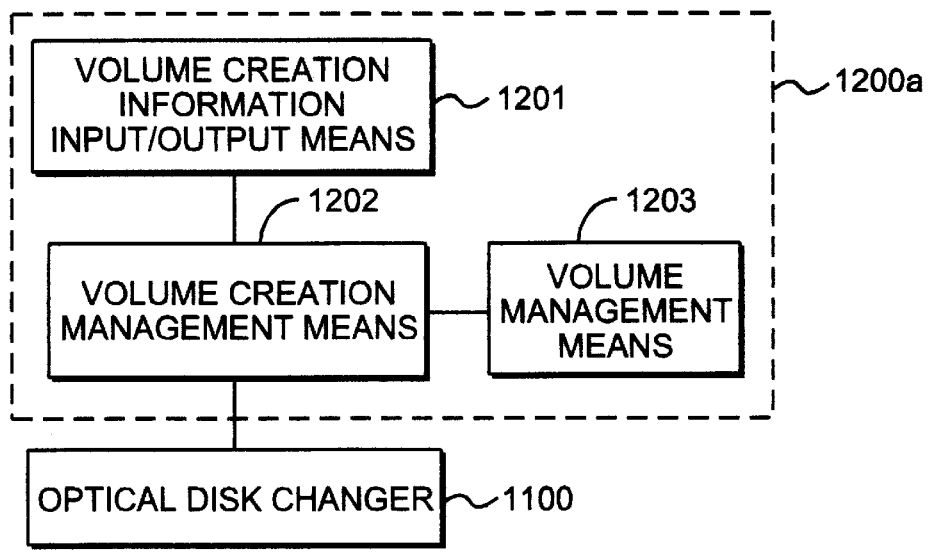
FIG. 4 is a diagram illustrating a construction of an optical disk changer system according to embodiments 1 to 4 of the present invention.

FIG. 4 is a diagram showing construction of the optical disk changer management apparatus 1200a according to the embodiments 1 to 4. The optical disk changer management apparatus 1200a includes a volume creation information input/output means 1201, a volume creation management means 1202 and a volume management means 1203, and is connected to the optical disk changer 1100 illustrated in FIG. 2.

Figure 5:
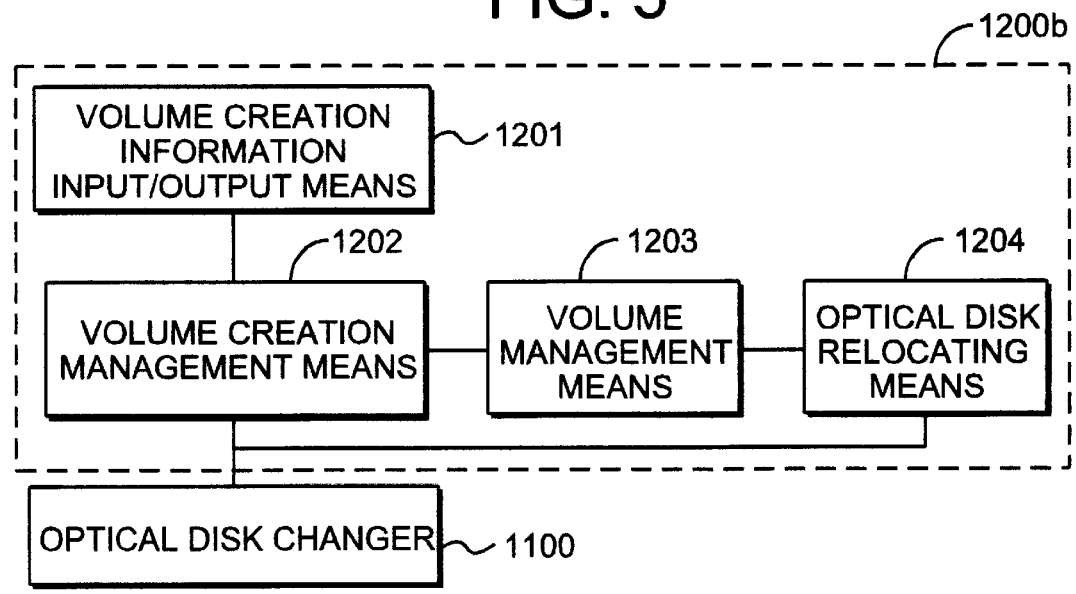
FIG. 5 is diagram illustrating the optical disk changer system according to an embodiment 5 of the present invention.

FIG. 5 is a diagram showing a construction of are optical disk changer 1200b according to an embodiment 5. The optical disk changer management apparatus 1200b includes the volume creation information input/output means 1201, the volume creation management table 1202, the volume management table 1203 and an optical disk relocating means 1204, and is connected to the optical disk changer 1100.

Figure 6:
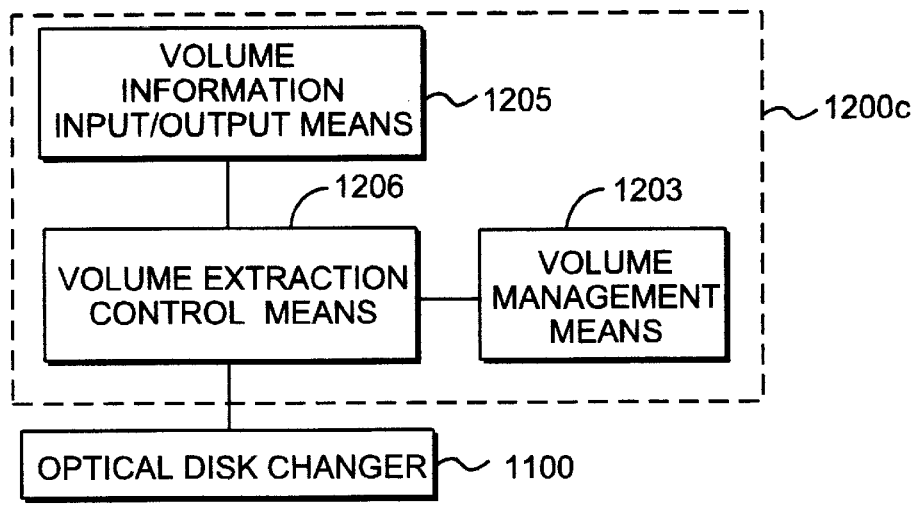
FIG. 6 is a diagram illustrating a construction of the optical disk changer system according to embodiments 6, 7, 9.

FIG. 6 is a diagram showing a construction of an optical disk changer 1200c according to the embodiments 6, 7, 9 of the present invention. The optical disk changer management apparatus 1200c includes a volume information input/output means 1205, a volume extraction control means 1206 and the volume management means 1203, and is connected to the optical disk changer 1100 illustrated in FIG. 2.

Figure 7:
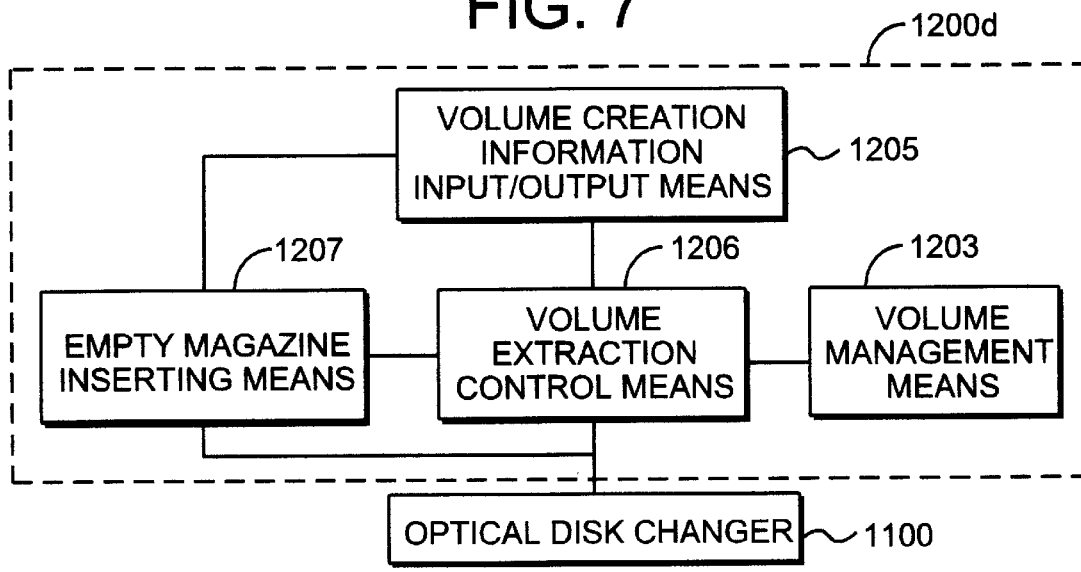
FIG. 7 is a diagram illustrating a construction of the optical disk changer system according to an embodiment 8 of the present invention.

FIG. 7 is a diagram showing a construction of an optical disk changer management apparatus 1200d according to an embodiment 8. The optical disk changer management apparatus 1200d includes the volume information input/output means 1205, the volume extraction control means 1206, the volume management means 1203 and an empty magazine inserting means 1207, and is connected to the optical disk changer 1100 illustrated in FIG. 2.

Figure 8:
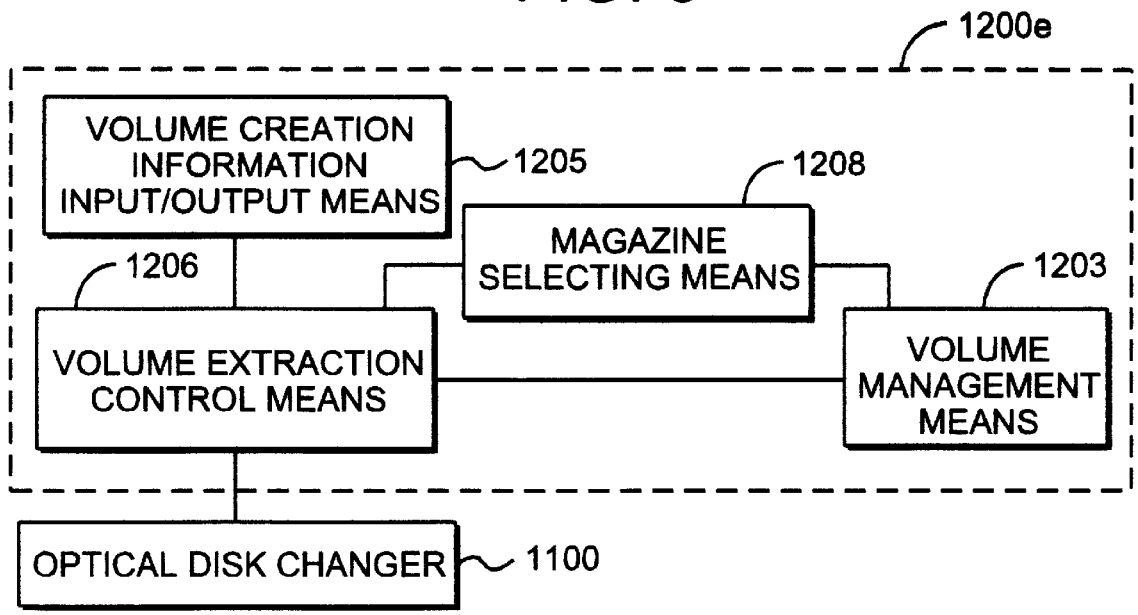
FIG. 8 is a diagram illustrating the optical disk changer system according to an embodiment 10 of the present invention.

FIG. 8 is a diagram illustrating a construction of an optical disk changer management apparatus 1200e according to an embodiment 10. The optical disk changer management apparatus 1200e includes the volume information input/output means 1205, the volume extraction control means 1206, the volume management means 1203 and a magazine selecting means 1208, which is connected to the optical disk changer 1100 illustrated in FIG. 2.

Figure 9:
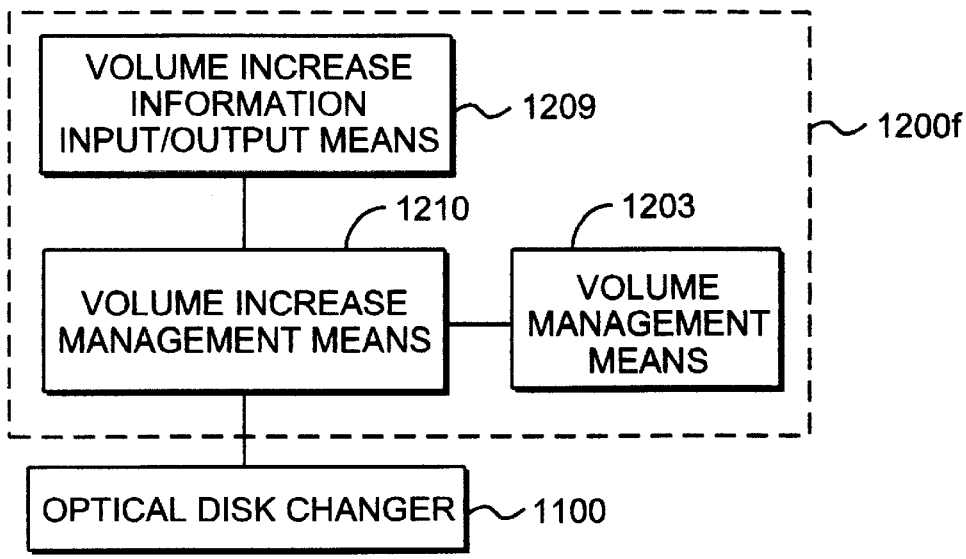
FIG. 9 is a diagram illustrating a construction of an optical disk changer system according to an embodiment 11 of the present invention.

FIG. 9 is a diagram showing a construction of an optical disk changer management apparatus 1200f according to an embodiment 11. The optical disk changer management apparatus 1200f includes a volume increase information input/output means 1209, a volume increase management means 1210 and the volume management means 1203, and is connected to the optical disk changer 1100 illustrated in FIG. 2.

FIG. 10 illustrates a content of a volume management table in the volume management means 1203 and the states of optical disks and magazines stored in the optical disk changer 1100 which correspond to ones illustrated in FIG. 3. The volume management table 1300 includes a storage position field 1301 and a volume name field 1302. The storage position field 1301 shows storage position where optical disks are stored. The volume name field 1302 stores a volume name when optical disks constitutes a volume, character series "unused" when optical disks are unused, character series "uninserted" when optical disks are uninserted and character series "no magazine" when magazines are not inserted. For example, optical disks constituting the volume name "AA" are stored in storage position 10.

FIG. 11 illustrates an unused optical disk management table 1400 in the volume management means 1203 and the states of optical disks and magazines which correspond to ones illustrated in FIG. 3.

The unused optical disk management table 1400 includes a slot number field 1401, a magazine presence field 1402, an unused optical disk number field 1403, a storage position field 1404 and an unused magazine field 1405. The slot number field 1401 shows a magazine slot number. The magazine presence field 1402 indicates the presence of magazines by "( )" and "x". The unused optical disk number field 1403 stores the number of unused optical disks stored in magazines. The storage position field 1404 stores the storage position of unused optical disks stored in magazines. The unused magazine field 1405 indicates whether it is the unused magazine or not which stores ten (the number of optical disks which can be inserted into a magazine) pieces of unused magazines by "x" and "( )". Final field of the magazine presence field 1402 is employed as total field 1406 of the number of magazines. Final field of unused optical disk number field 1403 is employed as total field 1407 of the number of unused optical disks. Final field of unused magazine field 1405 is employed as total field 1408 of the number of unused magazines.

The total field 1406 of the number of magazines stores the total number of magazines stored in the optical disk changer. The total field 1407 of the number of unused optical disks stores the total number of unused optical disks. The total field 1408 of the number of unused magazines stores the total number of unused magazines. For example, there is a magazine at the magazine slot number 3, six pieces of unused optical disks are stored in the storage positions "34, 35, 36, 37, 38, 39", respectively, indicating it is not an unused magazine. Total number of magazines is 8. The total number of unused optical disks is 36. Total number of unused magazines is 2.

[Embodiment 1]

A description is given of an embodiment 1 according to the first embodiment of the present invention referring to FIGS. 4 and 10 to 15. In the embodiment 1, in creating a volume which is to be extracted using a magazine, 10×Z pieces of optical disks stored in Z pieces of magazines are selected to create a volume by inputting the number of magazines.

A description is given of an operation of creating a volume "DD" consisting of 9 optical disks, as an example where the number of optical disks is received to create a volume. Assume that the optical disk changer 1100 is in the state illustrated in FIGS. 10 and 11.

When creating a volume which does not require extracting a volume, such as a volume storing system files in the construction of the optical disk changer 1100 using magazines, the user inputs a volume name and the number of optical disks constituting the volume to the volume creation information input/output means 1201. Herein, the user inputs "DD" as the volume name and "9" as the number of optical disks to the volume creation information input/output means 1201. Thereafter, the volume creation information input/output means 1201 outputs the "DD" and the "9" to a volume creation management means 1202.

The volume creation management means 1202 inquires of the volume management means 1203 storage position information of 9 unused optical disks and outputs the volume name "DD" to the same.

The volume management means 1203 outputs the storage position information of required number of unused optical disks (9 disks) to the volume creation management means 1202 referring to the unused optical disk management table illustrated in FIG. 14. The volume management means 1203 retrieves the unused optical disks in accordance with the following unused optical disk retrieval algorithm.

Initially, a magazine having the smallest slot number, among the magazines for which the unused magazine field 1405 in the unused optical disks management table 1400 is x, i.e., the magazine in which at least one among ten optical disks is in use. Next, required number of storage position information of unused optical disks are extracted from storage position field 1404 of the magazine in the ascending order of the magazine number. If the number of the disks is less than required, a magazine of the second smallest slot number is selected to repeat the same operation. If the required number is not reached after repeating the same operation as to every magazine of the unused magazine field 1405 "x", the same operation is repeated as to magazines of the unused magazine field 1405 "( )".

At this time, the volume management means 1203 outputs "15, 16, 17, 18, 19" (slot number 1) and "34, 35, 36, 37" (slot number 3) to the volume creation management means 1202 as the storage position information of unused optical disks, and changes a volume management table 1300 illustrated in FIG. 10 and an unused optical disk management table 1400 illustrated in FIG. 11 into ones illustrated in FIGS. 12 and 13, respectively. That is, the volume management means performs a series of operations of changing the volume name fields 1302 in the storage position field 1301 "15, 16, 17, 18, 19" and "34, 35, 36, 37" in the volume management table 1300 illustrated in FIG. 10 from "unused" to "DD", changing the unused optical disk number field 1403 of the slot number field 1401 "1" in the unused optical disk management table 1400 illustrated in FIG. 11 from 5 to 0, deleting "15, 16, 17, 18, 19" in the storage position field 1404, changing the unused optical disk number field 1403 of the slot number field 1401 "3" from 6 to 2, deleting "34, 35, 36, 37" in the storage position field 1404 and changing total number 1407 of unused optical disks from 36 to 27.

Finally, the volume creation management means 1202 creates a volume using 9 unused optical disks in the storage position "15, 16, 17, 18, 19, 34, 35, 36, 37" of the volume name "DD", whereby the operation is completed. A description of creating the volume is omitted, since this operation is similar to that described in the prior art optical disk changer management apparatus.

A description is given of an operation of creating the volume "DD" consisting of one magazine, as an example of a case where the number of magazines is received to create the volume when the volume which stores a data file or the volume to be extracted is created in the construction of the optical disk changer 1100 using magazines.

Assume that the optical disk changer 1100 is in the state illustrated in FIGS. 10 and 11 as described above. When creating a volume to be extracted in each magazine, the user inputs the volume name and the number of magazines constituting the volume to a volume creation information input/output means 1201. At this time, the user inputs "DD" as the volume name and "1" as the number of the magazines to the volume creation information input/output means 1201. The volume creation information input/output means 1201 outputs "DD" as the volume name and "1" as the number of magazines to the volume creation management means 1202.

The volume creation management means 1202 inquires of the volume management means 1203 the storage position information of ten unused optical disks stored in one unused magazine and outputs the volume name "DD" to the volume management means 1203. The volume management means 1203 outputs the storage position information of required number of unused optical disks stored in the required number of magazines (1 magazine) to the volume creation management means 1202 referring to the unused optical disk management table 1400.

The volume management means 1203 according to the embodiment 1 retrieves optical disks stored in the unused magazines in accordance with the following unused magazine retrieval algorithm. That is, the volume management means 1203 selects the required number of unused magazines of the unused magazine field 1405 "( )" in the unused optical disk management table 1400 in the ascending order of the number of slot number field 1401. The volume management means 1203 obtains the storage position field 1404 of the selected unused magazine as the storage position information of the unused optical disks.

Therefore, the volume management means 1203 selects the magazine of magazine slot number 6 to output "60, 61, 62, 63, 64, 65, 66, 67, 68, 69" to the volume creation management means 1202 as the storage position information of unused optical disks inserted into the magazine of magazine slot number 6, and changes the volume management table 1300 illustrated in FIG. 10 and the unused optical disk management table 1400 illustrated in FIG. 11 to ones illustrated in FIGS. 14 and 15, respectively. That is, the volume management means performs a series of operations of changing the volume name field 1302 in "the storage position field 130 "60, 61, 62, 63, 64, 65, 66, 67, 68, 69" in the volume management table 1300 from "unused" to "DD", changing the unused optical disk number field 1403 of the slot number field 1401 "6" in the unused optical disk management table 1400 illustrated in FIG. 11 from 10 to 0, deleting "60, 61, 62, 63, 64, 65, 66, 67, 68, 69" in the storage position filed 1404, changing the unused magazine field 1405 "( )" into "x", changing total field 1407 of the unused optical disks from 36 to 26, and changing the total field 1408 of unused magazines from 2 to 1.

Finally, the volume creation management means 1202 creates a volume using ten unused optical disks in the storage positions "60, 61, 62, 63, 64, 65, 66, 67, 68, 69" of the volume name "DD", whereby operation is completed.

When there is no unused optical disks of the same number as optical disks input from the volume creation information input/output means 1201, or there is no unused magazines of the same number as the input magazines in the optical disk changer 1100, the volume creation information input/output 1201 informs the user that the required volume cannot be created.

Thus, when the number of magazines "Z" (positive integer) is input to create the volume, 10×Z pieces of optical disks stored in Z pieces of magazines are selected to create the volume. In the Z pieces of magazines, only optical disks constituting the created volume are stored.

[Embodiment 2]

A description is given of an embodiment 2 according to the second aspect of the present invention referring to FIGS. 4, 10, 11, 16, 17, 18, 19. In this embodiment 2, when the number of unused magazines is Z or more and the number of unused disks is 10×(Z+Y) (Z and Y: positive integers) or more in the optical disk changer, 10×(Z+Y) optical disks stored in (Z+Y) magazines at its most are selected to create the volume by moving the unused optical disks.

First, a description is given of an operation of creating a volume "DD" consisting of three magazines as an example of a case where the optical disk changer 1100 receives the number of magazines that is larger than that of currently unused magazines to create the volume. Assume that the optical disk changer 1100 is in the state illustrated in FIGS. 10 and 11, that is, the number of unused magazines is 2.

When creating a volume consisting of disks which stores data files and to be extracted in each magazine, the user inputs the volume name and the number of magazines constituting the volume to the volume creation information input/output means 1201. At this time, the user inputs "DD" as the volume name and "3" as the number of magazines to the volume creation information input/output means 1201. Thereafter, the volume creation information input/output means 1201 outputs "DD" as the volume name and "3" as the number of magazines to the volume creation management means 1202. The volume creation management means 1202 inquires of the volume management means the numbers of unused optical disks and unused magazines. The volume management means 1203 outputs the numbers of the unused optical disks and the unused magazines to the volume creation management means 1202, referring to total field 1407 of unused optical disks and total field 1408 of unused magazines in FIG. 11. The volume creation management means 1202 obtains "36" as the number of unused optical disks and "2" as the number of unused magazines.

Thereafter, the volume creation management means 1202 compares the number of required magazines with the number of unused magazines. When the number of the unused magazines is not less than the number of the required magazines, the volume creation management means 1202 inquires of the volume management means 1203 the storage position information of the unused optical disks stored in the unused magazines of the same number as that of the required magazines, and outputs the volume name to the same. The following operation is the same as in the embodiment 1 where the number of magazines are received to create the volume.

On the other hand, when the number of the unused magazines is less than required (3), the number of the required magazines is compared with a quotient of the number of unused optical disks divided by 10 (the number of optical disks insertable into one magazine). When the quotient is not less than the required number, it is judged that required number of unused magazines can be created by moving optical disks between magazines. The number of required magazines minus the number of unused magazines becomes the number of unused magazine created by moving optical disks.

The volume creation management means 1202 outputs the number of unused magazines to be created to the volume management means 1203 and inquires movement destination storage position information and storage position information of unused optical disks, for creating unused magazines. By the fact that the number of required magazines is 3 more than 2 (the number of unused magazines), and 3 as a quotient of 36 (the number of unused optical disks) divided by 10 equals to the number of required magazines, it is judged that it is possible to create required number (3) of unused magazines by moving optical disks between magazines. One newly unused magazine is created by moving optical disks between the magazines.

The volume management means 1203 conducts retrieval according to the following algorithm upon receipt of an inquiry of the movement destination storage position information and storage position information of unused optical disks.

First, movement destination magazines after move of the same number as the number of the unused magazines to be created. As magazines after move, magazines of the number of unused magazines to be created are selected among magazines of the unused magazine field 1405 marked "x" and of a slot number having the largest number of the unused optical disk number field 1403. After selecting the magazine after move, movement destination storage position information and the storage position information of the unused optical disks to be moved are found. The movement destination storage position information becomes all storage positions of selected magazines after move except for the storage position of unused optical disks.

The storage position information of the unused optical disks to be moved is retrieved in accordance with the following algorithm. First, a magazine having the smallest number of unused optical disk number field 1403 is selected among magazines of the unused magazine field 1405 marked "x" in the unused optical disk management table 1400. Next, storage position information of the unused optical disks of the same number as the number of the movement destination storage position information is selected from the storage position field 1404 of the magazine in the ascending order of the optical disks. If the number is less than required, select a magazine having the second fewest unused optical disks to repeat the same operation.

In this case, a magazine of the magazine slot number 3 is selected as the magazine after move and the movement destination storage position information is "30, 31, 32, 33". The unused optical disks to be moved are selected from the magazine of the magazine slot number 1 and the storage position information is "15, 16, 17, 18".

The volume management means 1203 outputs the storage position information "30, 31, 32, 33" and the storage position information of the unused optical disks to be moved "15, 16, 17, 18" to the volume creation management means 1202. The volume creation management means 1202 which received the movement destination storage position information and the storage position information of the unused optical disks to be moved exchanges optical disks between the magazines in the ascending order of numbers based on the movement destination storage position information and the storage position information about the unused optical disks. At this time, the exchange begins in the optical disk in the storage position information "30" and the unused optical disk in the storage position information "15", and completes the optical disk in the storage position information "33" and the unused optical disk in the storage position information "18". After completion of the exchange, the volume creation management means 1202 outputs a flag indicating completion of move to the optical disk to the volume management means 1203.

Figure 1A:
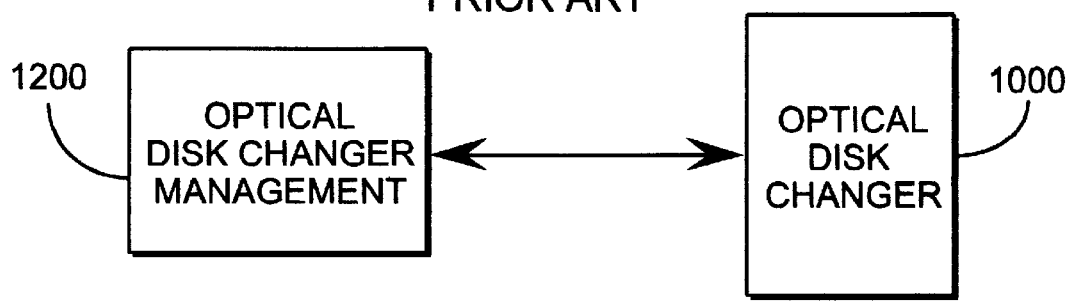
FIG. 1(a) and 1(b) are diagrams illustrating a construction of a prior art optical disk changer which does not employ magazines.
Figure 1B:
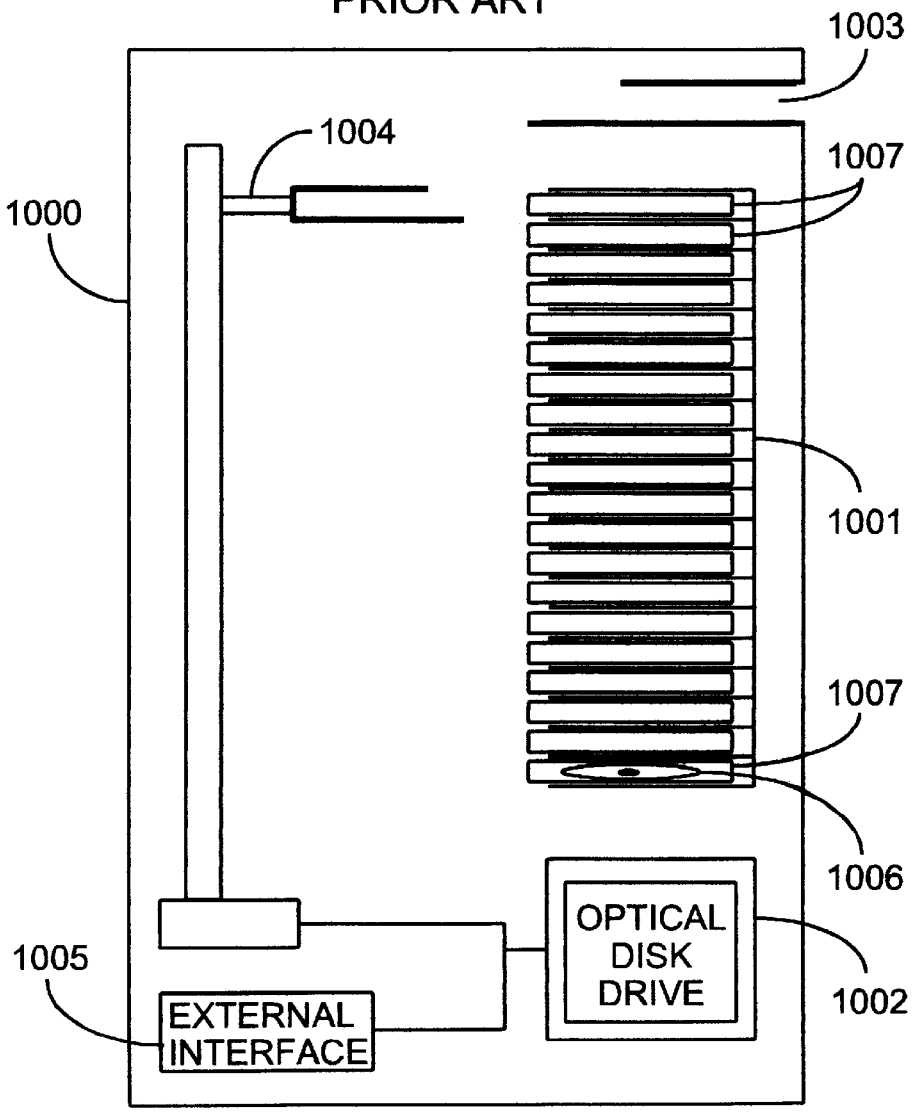

The volume management means 1203 which received the flag indicating completion of move changes the volume management table 1300 illustrated in FIG. 10 and the unused optical disk management table 1400 into ones illustrated in FIGS. 16 and 17, respectively based on the movement destination storage position information and the storage position information of the unused optical disks output to the volume creation management means. That is, the volume management means 1203 performs a series of operation of changing the volume name field 1302 in the storage position field 1301 "15, 16, 17, 18" in the volume management table 1300 in FIG. 1 from "unused" to "BB", changing the volume name field 1302 in the storage position field 1301 "30, 31, 32, 33" from "BB" to "unused", changing the unused optical disk number field 1403 of the slot number field 1401 "1" in the optical disk management table 1400 "15" to "1", deleting "15, 16, 17, 18" of the storage position field 1301, changing the unused optical disk field 1403 of the slot number field "3" from "6" to "1", adding "30, 31, 32, 33" to the storage position field 1301, changing the unused magazine field 1405 from "x" to "( )", and changing the total field 1408 of the unused magazine number from "2" to "3".

The volume creation management means 1202 inquires of the volume management means the storage position information of 30 unused optical disks stored in 3 unused magazines and outputs the volume name "DD" to the volume management means 1203. The volume management means 1203 obtains the storage position information of unused optical disks "30, 31, 32, 33, 34, 35, 36, 37, 38, 39, 60, 61, 62, 63, 64, 65, 66, 67, 68, 69, 70, 71, 72, 73, 74, 75, 76, 77, 78, 79" to output the same to the volume creation management means 1202 and changes the volume management table 1300 in FIG. 16 and the unused optical disk management table 1400 in FIG. 17 to ones in FIGS. 18 and 19, respectively. That is, the volume management means 1203 performs a series of operations of changing the volume name field 1302 in the storage position field 1301 "30, 31, 32, 33, 34, 35, 36, 37, 38, 39" and "60, 61, 62, 63, 64, 65, 66, 67, 68, 69, 70, 71, 72, 73, 74, 75, 76, 77, 78, 79" from "unused" to "DD", changing the unused optical disk number field 1403 of 3, 6 and 7 from 10 to 0, deleting "30, 31, 32, 33, 34, 35, 36, 37, 38, 39, 60, 61, 62, 63, 64, 65, 66, 67, 68, 69, 70, 71, 72, 73, 74, 75, 76, 77, 78, 79" of the storage position field 1401, changing the unused magazine field 1405 from "( )" to "x", changing the total field 1403 of the unused optical disk number from 36 to 6, and changing total field 1408 of the unused magazine number from 3 to 0. Finally, the volume creation management means 1202 creates a volume of the volume name "DD" using 30 unused optical disks in the storage positions "30, 31, 32, 33, 34, 35, 36, 37, 38, 39, 60, 61, 62, 62, 63, 64, 65, 66, 67, 68, 69, 70, 71, 72, 73, 74, 75, 76, 77, 78, 79", whereby operation completes. The number of the optical disks is received to create a volume as in the case of the embodiment 1 where the number of magazine is received to create the volume.

In accordance with the embodiment 2 constructed above, when there are no unused magazines, the number of which the user demands, unused optical disks dispersed into magazines other than the unused magazines are gathered to create an unused magazine, thereby the user's demand is met. Therefore, the user can use all unused optical disks optimally to create a volume which would be manageable by extracting the same from the optical disk changer, irrespective of arrangement of the unused optical disks in the current optical disk changer.

[Embodiment 3]

A description is given of an embodiment 3 according to the third aspect of the present invention referring to FIG. 4. In this embodiment 3, when X (X:positive integers) is specified by the user in creating a volume and X is a multiple of 10, X optical disks stored in (X÷10) magazines are selected to create the volume.

A description is given of an operation of creating a volume "DD" consisting of ten optical disks as an example of a case where the multiple of ten optical disks is received to create the volume. Assume that the optical disk changer 1100 is in the state illustrated in FIGS. 10 and 11.

When creating a volume consisting of optical disks which stores data files or the like and which requires extracting using magazines, the user inputs the volume name and the number of optical disks in a multiple of 10 constituting the volume to the volume creation information input/output means 1201. At this time, the user inputs "DD" as the volume name and "10" as the number of optical disks to the volume creation information input/output means 1201.

The volume creation information input/output means 1201 outputs the "DD" as the volume name and the "10" as the number of optical disks to the volume creation management means 1202. The volume creation management means 1202 judges whether the number of required optical disks is the multiple of 10 (the number of optical disks insertable into one magazine) or not. When the number is the multiple of 10, the volume creation management means 1202 inquires of the volume management means 1203 the storage position information of unused optical disks stored in unused magazines of the same number as a quotient of the required number divided by 10 and outputs the volume name to the same.

In this case, the volume creation management means 1202 inquires of the volume management means 1203 the storage position information of ten unused optical disks stored in one unused magazine and outputs the volume name "DD" to the volume management means 1203. The following operation is identical to the case illustrated in the embodiment 1 where the number of magazines is received to create the volume.

On the other hand, when the number of required optical disks is not the multiple of 10, the volume creation management means 1202 inquires of the volume management means 1203 the storage position information of unused optical disks of the same number as the required number and outputs the volume name to the same.

With the use of the construction described above, when the user inputs the number X to create a volume as well as the user inputs the number of magazines, X(X:multiple of 10) optical disks stored in (X÷10) magazines are selected to create the volume, so that the same effects are attained as in the case where the number of magazines are input.

[Embodiment 4]

A description is given of an embodiment 4 according to the fourth aspect referring to FIG. 4. The embodiment 4 deals with a case where a volume is created using the number of optical disks which the user inputs, as a unit, and required number of optical disks cannot be prepared using the number of unused magazines.

A description is given of an operation of creating a volume "DD" consisting of 30 optical disks as an example where the optical disk changer 1100 receives the number which is the multiple of 10 and larger than the number of currently unused magazines×10. Assume that the optical disk changer 1100 is in the state illustrated in FIGS. 10 and 11, that is, the number of currently unused magazines is 2.

When creating a volume consisting of disks storing data files or the like and which requires extracting using a magazine, the user inputs the volume name and the number of optical disks in a multiple of 10 constituting the volume to the volume creation information input/output means 1201. At this time, the user inputs "DD" as the volume name and "30" as the number of optical disks to the volume creation information input/output means 1201.

The volume creation information input/output means 1201 outputs the "DD" as the volume name and the "30" as the number of optical disks to the volume creation management means 1202. The volume creation management means 1202 inquires of the volume management means 1203 the storage position information of unused optical disks stored in unused magazines or storage position information of unused optical disks and outputs the volume name "DD" to the same. The following operation is identical to that already illustrated in the embodiment 2 where the number of magazines exceeding the number of unused magazines is received to create the volume.

The optical disk changer 1100 receives the number of optical disks which is not more than currently unused magazines×10 to create the volume as in the embodiment 3 where the number of the multiple of 10 optical disks is received to create the volume. Further, the user specifies the number which is not the multiple of 10 to create a volume as in the case of the embodiment 1 where the number of optical disks is received to create the volume.

When the user inputs the number of optical disks X (X: is positive integer and a multiple of 10) to create the volume in the construction described above, X optical disks stored in (X÷10) magazines are selected to create the volume. Also, when there are no (X÷10) unused magazines, unused optical disks dispersed into magazines other than unused magazines other than the unused magazines to create an unused magazine, whereby the user's demand is met. Therefore, in addition to the same effect attained when the number of magazines is input to create a volume, the user can use all unused optical disks optimally to create a volume which would be manageable by extracting the same from the optical disk changer irrespective of arrangement of the unused optical disks in the current optical disk changer.

[Embodiment 5]

A description is given of an embodiment 5 according to the fifth aspect of the present invention, referring to FIGS. 5, 10, 11, 20. In this embodiment 5, when optical disks are moved to create a volume in each magazine, after optical disks to be moved arc used to create a volume, free time of the system is employed to move optical disks between magazines.

A description is given of a case where the optical disk changer 1100 is in the state illustrated in FIGS. 10 and 11 as an example where the optical disk changer 1100 has a volume consisting of 10×Z (Z: positive integer) pieces of optical disks and dispersed into magazines more than Z. Assume that the optical disk relocating means 1204 illustrated in FIG. 5 starts its operation at AM 1:00 every day.

The optical disk relocating means 1204 which detected AM 1:00 inquires of the volume management means 1203 all the volume names stored in the optical disk changer 1100, the number of optical disks of the volume names and the number of magazines storing the optical disks constituting the volume. The volume management means 1203 conducts retrieval of the storage position and the total number of optical disks constituting each volume, slot number and the number of the magazines in accordance with the following retrieval algorithm.

The volume management means 1203 checks volume names in the storage position field 1301 "0" to "99" in the volume management table 1300 illustrated in FIG. 10 to identify an entry (a volume name field) storing the same volume name as a given volume. The number of the storage position field 1301 corresponding to the entry indicates the storage position of the optical disk constituting the given volume and total number of entries becomes the number of optical disks constituting the volume. A quotient of the storage position divided by 10 indicates the magazine number of the magazine storing the optical disks. The magazine number and the total number of the magazines storing the given volume are found by finding the magazine numbers of all entries.

Take an example of a volume name "AA". Find that 14 optical disks constituting the volume name "AA" are stored in the storage position field 1301 "10, 11, 12, 13, 14", "20, 21, 22, 23" and "80, 81, 82, 83, 84". In addition, 5 optical disks in the storage position field 1301 "10, 11, 12, 13, 14", 4 optical disks in the storage position field "20, 21, 22, 23", and 5 optical disks in the storage position field "80, 81, 82, 83, 84" are respectively stored in the magazines of magazine slot numbers 1, 2 and 8 in accordance with the calculating method. As a result, the volume "AA" is stored in 3 magazines.

The number of optical disks of the volume name "AA", the magazine slot number of the same, and the number of magazines of the same is "14", "1,2,8" and "3", respectively. Similarly, the number of optical disks of the volume name "BB", the magazine slot number of the same, and the number of magazines of the same is "10", "2,3" and "2", respectively. The volume management means 1203 outputs a set of the volume name, the number of optical disks and the number of magazines storing the optical disks to the optical disk relocating means 1204.

The optical disk relocating means 1204 selects a volume comprising 10×Z pieces of optical disks and stored in magazines more than Z. At this time, a volume "BB" is selected.

The optical disk relocating means 1204 performs a series of operation for the selected volume of inquiring of the volume management means 1203 the movement destination storage position information and movement origin storage position information of the optical disks constituting the volume, moving the optical disks based on the information and sending the flag indicating completion of move to the volume management means 1203.

The volume management means 1203 which received the inquiry of the movement destination storage position information and movement origin storage position information conducts retrieval in accordance with the following move storage position retrieval algorithm.

The volume management means 1203 finds a slot number of a magazine storing optical disks constituting the selected volume, the storage position of each optical disk in each magazine and total number of the optical disks in each magazine in accordance with the volume retrieval algorithm. Thereafter, the volume management means 1203 finds the number of magazines gathering optical disks. When an initial value of the magazines is Z and there are Y (Y:positive integer) magazines storing ten optical disks constituting the selected magazine, the number of the magazines gathering the optical disks becomes (Z–Y). Thereafter, the volume management means 1203 finds the movement destination storage position information and movement origin storage position information based on the number of the magazines gathering the optical disks. (Z–Y) magazines storing the most optical disks constituting the selected volume except for a magazine storing 10 optical disks constituting the selected volume are selected as magazines after move.

All storage positions of selected magazines after move except for the storage positions of optical disks constituting the selected volume becomes the movement destination storage position information. A magazine which is neither a magazine storing ten optical disks constituting the selected volume nor a magazine after move is selected among magazines storing optical disks constituting the selected volume as the magazine before move.

The storage positions of optical disks constituting the selected volume stored in the magazine before move becomes the movement origin storage position information. In this case, it is found that the selected volume "BB" consists of 6 optical disks in the storage positions "24, 25, 26, 27, 28, 29" of the magazine slot number 2, and 4 optical disks in the storage positions "30, 31, 32, 33" of the magazine slot number, 3 by the fact that the optical disks constituting the selected volume is in the storage positions "24, 25, 26, 27, 28, 29, 30, 31, 32, 33". Therefore, Z=1, Y=0 and the number of magazines gathering optical disks is 1. A magazine of the slot number 2 is selected as the magazine after move and the movement destination storage position information "20, 21, 22, 23". The movement origin storage position information is "30, 31, 32, 33".

The volume management means 1203 which found the movement destination storage position information and the movement origin storage position information outputs the same to the optical disk relocating means 1204. The optical disk relocating means 1204 performs exchange of optical disks in ascending order numerals of movement destination storage position information and movement origin storage position information. On completion of the move, the optical disk relocating means 1204 outputs the flag indicating completion of move to the volume management means 1203 and, simultaneously inquires of the volume management means 1203 the movement destination storage position information and movement origin storage position information of optical disks constituting the volume when there is another selected volume. The exchange begins in optical disks in the storage positions "20" and "30" and completes in optical disks in the storage positions "23" and "33". Since there is no another selected volume, the optical disk relocating means 1204 outputs only the flag indicating completion of move to the volume management means 1203 The volume management means 1203 which received the flag indicating completion of time changes the volume management table 1300 and the unused optical disk management table 1400 by the movement destination storage position information and movement origin storage position information output to the optical disk relocating means 1204.

In this case, though the volume management table 1300 illustrated in FIG. 10 is changed to the one illustrated in FIG. 20, since there is no move of unused optical disks, it is not necessary to change the unused optical disk management table 1400 in FIG. 11. The volume name field 1302 in the storage position field 1301 "20, 21, 22, 23" in the volume management table 1300 is changed from "AA" to "BB" and the volume name field 1302 in the storage position field 1301 "20, 21, 22, 23" is changed from "BB" to "AA" based on the movement destination storage position information and movement origin storage position information of optical disks with respect to another volume.

Thus constructed, it is not necessary to wait for completion of creating unused magazines and system wait time is reduced by utilizing free time of the system to move optical disks into Z pieces of magazines when unused magazines are less in number than required to create a volume and 10×Z pieces of optical disks constituting the volume are stored in magazines more than Z. As a result, efficiency of operation is increased.

[Embodiment 6]

A description is given of an embodiment 6 according to the sixth aspect of the present invention referring to FIGS.

6, 10. In this embodiment 6, when a volume consists of optical disks of a multiple of 10, a specific control method is provided for extracting the volume by Z pieces of magazines.

Initially, a description is given of an operation of extracting a volume "BB" consisting of ten optical disks dispersed into 2 magazines as an example of a case where a volume consisting of 10×Z (Z:positive integer) pieces of optical disks dispersed into magazines more than Z requires extracting. Assume that the optical disk changer 1100 is in the state illustrated in FIGS. 10 and 11.

A volume information input/output 1205 which has received extraction request of the volume name "BB" outputs the volume name "BB" to a volume extraction control mean 1206. The volume extraction control means 1206 inquires of the volume management means 1203 the numbers of optical disks constituting the volume name "BB" and magazines storing the same. The volume management means 1203 conducts retrieval of the storage positions, and the number of optical disks corresponding to the volume name, and the slot number of a magazine storing the optical disks in accordance with the volume retrieval algorithm illustrated in FIG. 5. The storage positions, the number of optical disks, the magazine slot number and the number of magazines, of the volume name "BB" are "24, 25, 26, 27, 28, 29" and "30, 31, 32, 33", "10", "2,3" and "2", respectively.

The volume management means 1203 which found the numbers of optical disks constituting the volume name "BB" and magazines storing the optical disks outputs "10" as the number of optical disks and "2" as the number of magazines to the volume extraction control means 1206. The volume extraction control means 1206 checks whether the number of optical disks is 10×Z (Z: positive integer) and the number of magazines is Z or not. Since the number of optical disks is 10×1 (Z=1) and the number of magazines is not 1, the volume extraction control means 1206 instructs the user not to extract the optical disks constituting the volume name "BB" in each magazine through the volume information input/output means 1205.

A description is given of an operation of extracting a volume "CC" consisting of 20 optical disks dispersed into 2 magazines, as an example of a case where a volume consisting of 10×Z (Z:positive integer) pieces of optical disks dispersed into Z magazines requires extracting. Similarly, assume that the optical disk changer 1100 is in the state illustrated in FIGS. 10 and 11.

The volume information input/output means 1205 which received an extraction request of the volume name "CC" outputs the same to the volume extraction control means 1206. The volume extraction control means 1206 inquires of the volume management means 1203 the numbers of optical disks constituting the volume name "CC" and magazines storing the optical disks. The volume management means 1203 conducts retrieval of the storage positions and the number of optical disks corresponding to the volume name, and the slot number and the number of magazines storing the same. The storage positions, the number of optical disks, the magazine slot number and the number of magazines, of the volume name "CC" are "40, 41, 42, 43, 44, 45, 46, 47, 48, 49" and "50, 51, 52, 53, 54, 55, 56, 57, 58, 59", "20", "4, 5" and "2", respectively.

The volume management means 1203 which found the numbers of optical disks constituting the volume name "CC" and magazines storing the optical disks outputs "20" as the number of optical disks and "2" as the number of magazines to the volume extraction control means 1206.

The volume extraction control means 1206 checks whether the number of optical disks is 10×Z (Z: positive integer) and the number of magazines is Z or not. The volume extraction control means 1206 instructs the user to extract optical disks constituting the volume name "CC" in each magazine through the volume information input/output means 1205. In addition, the volume extraction control means 1206 instructs the user not to extract a volume consisting of optical disks of the number other than 10×Z in each magazine.

The construction described-above allows the volume extraction control means 1206 to permit extraction of a volume by Z pieces of magazines only when the volume to be extracted consists of 10×Z (Z: positive integer) pieces of optical disks dispersed into the Z pieces of magazines. As a result, extraction of a magazine storing optical disks constituting a plurality of volumes by mistake is avoided.

[Embodiment 7]

A description is given of an embodiment 7 according to the seventh aspect of the present invention referring to FIGS. 6, 10, and 11. In this embodiment 7, a specific control method is provided for permitting extraction of a volume using Z pieces of magazines when optical disks of a multiple of 10 constitutes the volume. More specifically, disks are moved to allow extraction in each magazine on receipt of an extraction request, although the volume cannot be extracted when constituting the volume.

A description is given of an operation of extracting a volume "BB" consisting of tan optical disks dispersed into 2 magazines as an example of a case where the volume consisting of 10×Z (Z:positive integer) pieces of optical disks stored in magazines more than Z is extracted. Assume that the optical disk changer 1100 is in the state illustrated in FIGS. 10 and 11.

The volume information input/output means 1205 which received an extraction request of the volume name "BB" outputs the volume name "BB" to the volume extraction control means 1206. The volume extraction control means 1206 inquires of the volume management means 1203 the numbers of optical disks and of magazines storing optical disks constituting the volume name "BB". The volume management means 1203 conducts retrieval of the storage positions and the number of optical disks corresponding to the volume name, the slot number and the number of magazines in accordance with the volume retrieval algorithm illustrated in the embodiment 5. The storage positions, the number of optical disks, the magazine slot number and the number of magazines, of the volume name "BB" are "24, 25, 26, 27, 28, 29" and "30, 31, 32, 33", "10", "2,3" and "2".

The volume management means 1203 which found the number and the storage positions of the optical disks constituting the volume "BB", and the number of magazines storing the optical disks outputs "10" as the number of optical disks and "2" as the number of magazines to the volume extraction control means 1206.

The volume extraction control means 1206 which obtained the numbers of the optical disks and the magazines, and the storage positions of the optical disks initially checks whether the number of optical disks is 10×Z (Z: positive integer) or not. When the number is not 10×Z, the volume extraction control means instructs the user not to extract the optical disks constituting the volume of the extraction request through the volume information input/output means 1205. On the other hand, when the number is 10×Z, the volume extraction control means 1206 checks whether the number of magazine is Z or not. When the number of magazines is Z, the volume extraction control means 1206 informs the user of permission to extract optical disks constituting the volume of extraction request in each magazine through the volume information input/output means 1205. When the number is not Z, the volume extraction control means 1206 inquires of the volume management means 1203 the movement destination storage position information and movement origin storage position information. In this case, the volume extraction control means 1206 inquires of the volume management means 1203 the movement destination storage position information and movement origin storage position information of the volume "BB" by the fact that the number of optical disks is 10×1 (Z=1) and the number of magazines is not 1.

The volume management means 1203 which received an inquiry of the movement destination storage position information and movement origin storage position information of optical disks constituting the volume "BB" finds the same in accordance with the move storage position retrieval algorithm illustrated in the embodiment 5. Since Z=1 and there are no magazines storing ten optical disks constituting the volume name "BB" of the extraction request (Y=0), the number of magazines gathering optical disks is 1. A magazine of slot number 2 is selected as a magazine after move, since a magazine storing the most optical disks constituting the volume name "BB" is selected and the movement destination storage position information is "20, 21, 22, 23". A magazine of slot number 3 is selected as the magazine before move and the movement origin storage position information is "30, 31, 32, 33".

The volume management means 1203 which found the movement destination storage position information and movement origin storage position information outputs the same to the volume extraction control means 1206. The volume extraction control means 1206 which obtained the movement destination storage position information and movement origin storage position information performs exchange of optical disks in the ascending order of movement destination storage position information and movement origin storage position information The exchange begins in optical disks of the storage position information "20" and "30" and completes in optical disks of the storage position information "23" and "33".

After completion of exchange, the volume extraction control means 1206 outputs a flag indicating completion of move to the volume management means 1203 and informs the user of permission to extract optical disks constituting the volume name "BB" in each magazine through the volume information inputting/outputting means 1205. The volume management means 1203 which received the flag indicating completion of move changes the volume management table 1300 in FIG. 10 and the unused optical disk management table 1400 in FIG. 11 based on the movement destination storage position information and movement origin storage position information output to the volume extraction control means 1206. At this time, the volume management table 1300 in FIG. 10 is changed into the one illustrated in FIG. 20, but since there is no move of unused optical disks, it is not necessary to change the unused optical disk management table 1400 illustrated in FIG. 11. The volume management means 1203 changes the volume name field 1302 in the storage position field "20, 21, 22, 23" in the volume management table 1300 from "AA" to "BB", and the volume name field 1302 in the storage positions "30, 31, 32, 33" from "BB" to "AA". A volume consisting of 10×Z pieces of optical disks stored in Z pieces of magazines as in the embodiment 6. The volume extraction control means 1206 instructs the user not to extract the volume consisting of 14 optical disks, that is, not consisting of optical disks of a multiple of 10 in each magazine as in the embodiment 6.

The construction described above allows the volume consisting of 10×Z pieces of optical disks to be extracted by Z pieces of magazines by moving optical disks constituting the volume to be extracted to magazines. Therefore, it is not necessary to move unused optical disks for creating a volume. Addition, optical disks are not moved for moving a volume not to be extracted to magazines.

[Embodiment 8]

A description is given of an embodiment 8 according to the eighth aspect referring to FIGS. 7, 10, 11, 21. In this embodiment 8, when the user demands extraction of a volume, a volume consisting of arbitrary number of optical disks can be extracted using a magazine, by inserting required number of empty magazines storing no optical disks for extraction and moving optical disks constituting the existing volume to the inserted empty magazines.

A description is given of an operation of extracting a volume "AA" consisting of 14 optical disks stored in 2 magazines as an example of a case where a volume which is not consisting of 10×Z (Z: positive integer) pieces of optical disks. Assume that the optical disk changer 1100 is in the state illustrated in FIGS. 10 and 11, that is, the number of insertable magazines is 2.

The volume information input/output means 1205 which received an extraction request of the volume "AA" outputs the volume "AA" to the volume extraction control means 1206. The volume extraction control means 1206 inquires of the volume management means 1203 the numbers of optical disks constituting the volume "AA" and insertable magazines. The volume management means 1203 conducts retrieval of the number of optical disks constituting the volume in accordance with the volume retrieval algorithm illustrated in the embodiment 5. The volume name "AA" consists of 14 optical disks. Thereafter, the number of insertable magazines is found. The number of magazines storable in the optical disk changer minus the number of the total field 1406 in the unused optical disk management table 1400 becomes the number of insertable magazines. Since the number of insertable magazines into the optical disk changer is 10 and the number of the total field 1406 is 8, the number of insertable magazines is 2.

The volume management means 1203 which found the numbers of optical disks constituting the volume name "AA" and insertable magazines outputs "14" as the number of optical disks and "2" as the number of insertable magazines to the volume extraction control means 1206. The volume extraction control means 1206 finds the fewest magazines required to store the optical disks constituting the volume. When the number of optical disks constituting the volume is a multiple of 10(the number of optical disks insertable into one magazine), a quotient of the number of optical disks divided by 10 becomes the number of the fewest magazines, and when the number is not the multiple of 10, the quotient plus 1 becomes the number of the fewest magazines.

Thereafter, the number of the fewest magazines is compared with the number of insertable magazines. When the number of insertable magazines is less than the number of the required fewest magazines, the volume extraction control means 1206 instructs the user not to extract the required volume after insertion of the empty magazines through the volume information input/output means 1205. When the insertable magazines is not less than the required fewest magazines in number, the volume extraction control means 1206 inquires of the volume management means 1203 the slot number of empty magazines. Since the number of the optical disks is 14, the number of the fewest magazines is 2. Since the number of insertable magazines is 2, the volume extraction control means 1206 inquires of the volume management means 1203 the magazine slot number of 2 empty magazines.

The volume management means 1203 conducts retrieval of required number of the slot number field 1401 of the magazine presence field 1402 "x" in the unused optical disk management table 1400 in FIG. 11 to output the retrieval result to the volume extraction control means 1206. The retrieval is performed in the ascending order of the slot number. The volume management means 1203 outputs "0, 9" as the slot number to the volume extraction control means 1206. The volume extraction control means 1206 outputs "0, 9" as the magazine slot number of empty magazines to be inserted into an empty magazine inserting means 1207.

The empty magazine inserting means 1207 displays the number of slot inserting the empty magazines through the volume information input/output means 1205. The empty magazine inserting means which checked the insertion of the empty magazines into the slot of the specified number outputs "0, 9" as the slot number to the volume extraction control means 1206.

The volume extraction control means 1206 which received the slot number inquires of the volume management means 1203 the movement destination storage position information, i.e, the storage position information about the empty magazines and movement origin storage position information, i.e., storage position information of optical disks constituting. the volume AA. The volume management means 1203 conducts retrieval of the storage position and the number of optical disks corresponding to the volume name in accordance with the volume retrieval algorithm illustrated in the embodiment 5.

The storage positions and the number of optical disks, of the volume "AA" are "10, 11, 12, 13, 14, 20, 21, 22, 23, 80, 81, 82, 83, 84" and "14". Also, the volume management means 1203 finds the storage position information in each magazine. The magazine of the magazine slot number Z has 10, i.e., (Z×10) to ((Z+1)×10−1) storage position information. The magazine of the magazine slot number "0" includes storage position information "0, 1, 2, 3, 4, 5, 6, 7, 8, 9" and the magazine of the magazine slot number 9 includes the storage position information "90, 91, 92, 93, 94, 95, 96, 97, 98, 99". Thereafter, the volume management means finds movement destination storage position information, i.,e., the storage positions selected among all storage positions of the empty magazines. The retrieval is performed in the ascending order of the storage position number. Since the volume name "AA" consists of 14 optical disks, "0, 1, 2, 3, 4, 5, 6, 7, 8, 9, 90, 91, 92, 93" becomes the movement destination storage position information. The movement origin storage position information becomes the storage position information about optical disks constituting the volume, i.e., "10, 11, 12, 13, 14, 20, 21, 22, 23, 80, 81, 82, 83, 84". The volume management means 1203 outputs the movement origin storage position information and the movement destination storage position information to the volume extraction control means 1206.

The volume extraction control means 1206 moves the optical disks to the empty magazines based on the movement destination storage position information and movement origin storage position information. At this time, the volume extraction control means moves the optical disks to the storage position in the order of ascending numbers. The move begins in the optical disk of the storage position information "10" and the storage position information "0" and completes in the optical disk of the storage position information "84" and the storage position information "93".

After completion of exchange, the volume extraction control means 1206 outputs the flag indicating completion of move to the volume management means 1203 and informs the user of a permission to extract optical disks constituting the volume name "AA" in each magazine, through the volume information input/output means 1205. The volume management means 1203 which received the flag indicating completion of move changes the volume management table 1300 in FIG. 10 and unused optical disk management table 1400 in FIG. 11 to the ones illustrated in FIGS. 21 and 22, respectively. That is, the volume management means 1203 performs a series of operation of changing the volume name field 1302 in the storage position field 1301 "0, 1, 2, 3, 4, 5, 6, 7, 8, 9, 90, 91, 92, 93" in the volume management table 1300 illustrated in figure from "no magazines" to "AA", changing the volume name field in the storage position field 1301 "10, 11, 12, 13, 14, 20, 21, 22, 23, 80, 81, 82, 83, 84" from "AA" to "uninserted", changing presence field 1402 of magazines of the slot number field 1401 "0, 9" in the unused optical disk management table 1400 from "x" to "( )", and changing the total field 1406 of the magazine 1406 from 8 to 10.

With the use of the construction, required empty magazines having no optical disks are inserted for extraction and optical disks constituting the volume are moved to the inserted empty magazines, thereby allowing extraction of the volume consisting of arbitrary number of optical disks in each magazine.

In the embodiment 8, uninserted magazine slots of required fewest magazines are necessary. However, when one empty magazine can be inserted, a volume consisting of arbitrary number of optical disks can be extracted in each magazine by repeating insertion of empty magazines, movement of optical disks and extraction of the magazine.

Processing can be simplified by predetermining the magazine slot number for inserting the empty magazine.

[Embodiment 9]

A description is given of an embodiment 9 according to the ninth aspect of the present invention referring to FIGS. 6, 10, 11, 23, 24. In this embodiment 9, when the user demands extraction of a volume consisting of optical disks of a multiple of 10, the optical disks constituting the volume are moved to Z pieces of magazines in the descending order of slot number to extract the same.

A description is given of an operation of extracting a volume "BB" consisting of ten optical disks as an example of a case where a volume consisting of 10×Z pieces of optical disks is extracted. The optical disk changer 1100 is in the state illustrated in FIGS. 10 and 11.

The volume information input/output means which received an extraction request of the volume name "BB" outputs "BB" as the volume name to the volume extraction control means 1206. The volume extraction control means 1206 inquires of the volume management means 1203 the number of optical disks constituting the volume name "BB." The volume control means 1203 conducts retrieval of the number of optical disks constituting the volume in accordance with the volume retrieval algorithm in the embodiment 5. The number of optical disks constituting the volume name "BB" becomes 10. The volume management means 1203 which found the number optical disks constituting the volume outputs "10" as the number of optical disks to the volume extraction control means 1206.

The volume extraction control means 1206 checks whether the number of optical disks is 10×Z (Z: positive integer) or not. When the number is not 10×Z, the volume extraction control means 1206 instructs the user not to extract the optical disks in each magazine through the volume information input/output means 1205. When the number is 10×Z, the optical disks constituting the volume are moved for extraction. Since the volume "BB" consists of ten optical disks, the optical disks constituting the volume are moved. In this embodiment, Z pieces of specified magazines are selected among inserted magazines in the descending order of the slot number.

The volume extraction control means 1206 inquires of the volume management means 1203 presence of magazines corresponding to the slot number to select the magazine. At this time, the volume management means 1203 outputs "no" in case of the slot numbers 0 and 9 and "present" in case of the slot numbers 1 to 8 to the volume extraction control means 1206. The volume extraction control means 1206 selects one magazine of the slot number 8 based on the presence information of magazines corresponding to the slot number.

The volume extraction control means 1206 inquires of the volume management means 1203 about the movement destination storage position information, i.e., the storage position information about the magazine slot number and the movement origin storage position information, i.e., the storage position information of optical disks constituting the volume "BB" to move the optical disks to the magazine of the slot number 8. The volume management means 1203 conducts retrieval of the storage position of optical disks corresponding to the volume name in accordance with the volume retrieval algorithm illustrated in the embodiment 5. The storage positions of the volume name "BB" are "24, 25, 26, 27, 28, 29, 30, 31, 32, 33".

Also, every storage position information corresponding to the magazine slot number is found. The magazine of the magazine slot number Z has ten, i.e., (Z×10) to ((Z+1)×10−1)) storage positions. The magazine of the magazine slot number 8 has "80, 81, 82, 83, 84, 85, 86, 87, 88, 89" storage position information of optical disks.

Thereafter, every storage position information of optical disks of the selected magazines is compared with the storage position information about optical disks constituting the volume. When there is a storage position in common, it is deleted from both storage position information, resulting in the movement destination storage position information and movement origin storage position information. Since there is no storage position in common between the storage position information of all optical disks of the magazine slot number 8 and the storage position information of the volume "BB", the storage position information of all optical disks in the magazine of the magazine slot number 8 becomes the movement destination storage position information and the storage position information of the volume "BB" becomes the movement origin storage position information.

The volume management means 1203 which found the movement destination storage position information and movement origin storage position information move outputs the same to the volume extraction control means 1206. The volume extraction control means 1206 performs exchange of optical disks in the ascending order of the movement destination storage position information and movement origin storage position information. The exchange begins in the optical disks of the storage position information "24" and "80" and completes in the optical disks of the storage position information "33" and "89".

After completion of exchange, the volume extraction control means 1206 outputs the flag indicating completion of move to the volume management means 1203 and informs the user of permission to extract optical disks constituting the volume name "BB" in each magazine through the volume information input/output means 1205. The volume management means 1203 which received the flag indicating completion of move changes the volume management table 1300 in FIG. 10 and the unused optical disk management table 1400 in FIG. 11 to ones illustrated in FIGS. 23 and 24, respectively based on movement destination storage position information and movement origin storage position information output to the volume extraction control means 1206. That is, the volume management means 1203 performs a series of operation of changing the volume name field 1302 in the storage position field 1301 "80, 81, 82, 83, 84, 85, 86, 87, 88, 89" to "BB", changing the volume name field 1302 in the storage position field 1301 "24, 25, 26, 27, 28" from "BB" to "AA", changing the volume name field 1302 in the storage position field 1301 "29, 30, 31, 32, 33", from "BB" to "unused", changing the unused optical disk number field 1403 of the slot number field 1401 "1" from "5" to "0", deleting "15, 16, 17, 18, 19" in the storage position field 1404, changing the unused optical disk number field 1403 of the slot number field 1401 "2" from "0" to "1", adding "29" to the storage position field 1404, changing the unused optical disk number field 1403 of the slot number field 1401 "3" from "6" to "10", adding "30, 31, 32, 33" to the storage position field 1404 and changing the unused magazine total field 1408 from "2" to "3".

The volume extraction control means 1206 instructs the user not to extract a volume consisting of 14 optical disks that is, not consisting of optical disks of the multiple of 10, in each magazine as in the embodiment 6.

In the construction described above, when the user demands an extraction of the volume consisting of 10×Z (Z: positive integer) pieces of optical disks, optical disks constituting the volume are moved to specified Z pieces of magazines, to extract the same, and magazines in the fixed slot number are selected to identify the magazine to be extracted with ease by moving optical disks constituting the volume to be extracted to Z pieces of magazines in the descending order of the magazine slot number.

In this embodiment 9, magazines are selected in the descending order of magazine slot number to extract the same sequentially, for storing the optical disks therein. Alternatively, magazines may be selected in the ascending order of magazine slot number to store the unused optical disks. Further, optical disks may be stored in arbitrary magazines.

[Embodiment 10]

A description is given of an embodiment 10 according to the tenth aspect of the present invention referring to FIGS. 8 and 10. In this embodiment 10, when the user demands extraction of a volume to be extracted consisting of 10×Z (Z: positive integer) pieces of optical disks, the optical disks constituting the volume are extracted by Z pieces of magazines taking the most time to carry the same from an optical disk drive.

A description is given of an operation of extracting the volume "BB" consisting of ten optical disks as an example of a case where a volume consisting of 10×Z (Z: positive integer) pieces of optical disks. Assume that the optical disk changer 1100 is in the state illustrated in FIGS. 10 and 11.

The volume extraction control means 1206 obtains the number of optical disks as in the embodiment 9. As a result, the volume extraction control means 1206 obtains "10" as tho number of optical disks. Thereafter, the volume extraction control means 1206 checks whether the number of optical disks is 10×Z (Z: positive integer) or not. When the number is not 10×Z, the volume extraction control means 1206 instructs the user not to extract optical disks in each magazine through the volume information input/output means 1205. When the number is 10×Z, the volume extraction control means the magazine selecting means 1208 about Z pieces of magazine slot numbers after move. Since the number of the optical disks is 10, Z=1. Therefore, the volume extraction control means 1206 inquires of the magazine selecting means 1208 the magazine slot number of one magazine.

The smaller the magazine slot number is, the farther the magazine is from the optical disk drive 1103. Therefore, the smaller the magazine slot number of a magazine is, the longer it takes to carry the optical disks to the magazine.

Thus, the magazine selecting means 1208 selects Z pieces of magazines among inserted magazines in the ascending order of the magazine slot number.

The magazine selecting means 1208 inquires of the volume management means 1203 presence of magazines corresponding to the slot number and selects Z pieces of magazines in the ascending order of the magazine slot number to output the same to the volume extraction control means 1206. The magazine selecting means 1208 receives "no" in the slot numbers "0, 9" and "present" in the slot numbers 1 to 8 and selects the magazine of the slot number 1 to output the same to the volume extraction control means 1206. The following operation is similar to that already described in the embodiment 9.

The volume extraction control means 1206 instructs the user not to extract a volume consisting of 14 optical disks i.e., optical disks other than the multiple of 10.

The construction described above allows the following. When the user demands extraction of 10×Z (Z: positive integer) pieces of optical disks constituting the volume to be extracted, the optical disks are moved to Z pieces of magazines taking the most time to carry the same from the optical disk drive, thereby it is probable that optical disks in use are stored in the magazine taking a little time to carry the same to the optical disk drive. As a result, time to carry the optical disks in use to the optical disk drive is reduced.

[Embodiment 11]

A description is given of an embodiment 11 according to the eleventh aspect of the present invention referring to FIGS. 9, 10, 11, 25, 26, 27, 28. In this embodiment 11, 10×Z optical disks stored in Y magazines are selected to add capacities to the volume consisting of 10×Z (Z; positive integer) pieces of optical disks stored in Z pieces of magazines.

A description is given of an operation of adding 9 optical disks to the volume "BB" as an example of a case where the number of optical disks is received to add capacities to the existing volume. Assume that the optical disk changer 1100 is in the state illustrated in FIGS. 10 and 11.

When capacities are added to a volume not to be extracted, consisting of disks storing system files or the like, the user inputs the volume name and the number of optical disks to be added to the volume to the volume increase information input/output means 1209. At this time, the user inputs "BB" as the volume name and "9" as the number of optical disks to the volume increase information input/output means 1209.

The volume increase information input/output means 1209 outputs the "BB" and the "9" to the volume increase management means 1210. The volume increase management means 1210 inquires of the volume management means 1203 the storage position information of 9 unused optical disks and outputs the volume name "BB" to the volume management means 1203. The volume management means 1203 conducts retrieval of the storage position information of required number of unused optical disks in accordance with the unused optical disk retrieval algorithm illustrated in the embodiment 1. The volume management means 1203 "15, 16, 17, 18, 19, 34, 35, 36, 37" as the storage position information of unused optical disks to the volume increase management means 1210 and changes the volume management table 1300 in FIG. 10 and the unused optical disk management table 1400 in FIG. 11 to the ones illustrated in FIGS. 25 and 26, respectively. That is, the volume management means 1203 performs a series of operation of changing "unused" in the volume name field 1302 in the storage position 1301 "15, 16, 17, 18, 19, 34, 35, 36, 37" in the management table 1300 in FIG. 10 to "BB", changing "5" in the unused optical disk field 1403 of the slot number field 1401 "1" in the unused optical disk management table 1400 in FIG. 11 to "0", deleting "15, 16, 17, 18, 19" in the storage position field 1404, changing the unused optical disk field 1403 of the slot number field 1401 "3" from "6" to "2", deleting "34, 35, 36, 37" in the storage position field 1404 and changing "36" in the total field 1407 of the unused optical disks to "27". Finally, the volume increase management means 1210 uses 9 unused optical disks in the storage position "15, 16, 17, 18, 19, 34, 35, 36, 37" of the volume name "BB", to increase the volume, whereby the operation is completed. Since a description of this operation is the same as the one to create the volume, it is omitted herein.

A description is given of an operation of adding one magazine to a volume "CC" as an example of a case where the number of magazines are received to add capacities to an existing volume. Assume that the optical disk changer 1100 is in the state illustrated in FIGS. 10 and 11.

When capacities are added to a volume to be extracted in each magazine, the user inputs the volume name and the number of magazines adding capacities to the volume to the volume increase information input/output means 1209. At this time, the user inputs 37 CC" as the volume name and "1" as the number of magazines to the volume increase information input/output means 1209.

The volume increase information input/output means 1209 outputs the "CC" and the "1" to the volume increase management means 1210. The volume increase management means 1210 inquires of the volume management means the storage position information of 10 unused optical disks stored in one unused magazine and outputs the volume name "CC" to the volume management means 1203.

The volume management means 1203 conducts retrieval of ten unused optical disks stored in one magazine in accordance with the unused magazine retrieval algorithm illustrated in the embodiment 1.

The volume management means 1203 selects the magazine of the magazine slot number 6 to output "60, 61, 62, 63, 64, 65, 66, 67, 68, 69" as the storage position information of unused optical disks inserted in the magazine of the magazine slot number 6 to the volume increase management means 1210 and changes the volume management table 1300 in FIG. 10 and the unused optical disk management table 1400 in FIG. 11 to the ones illustrated in FIGS. 27 and 28.

The volume management means 1203 performs a series of operation of changing the volume name field 1302 in the storage position field 1301 "60, 61, 62, 63, 64, 65, 66, 67, 68, 69" from "unused" to "CC", changing the unused optical disk number field 1403 of the slot number field 1401 "6" in the unused optical disk management table in FIG. 11 from "10" to "0", deleting "60, 61, 62, 63, 64, 65, 66, 67, 68, 69" in the storage position field 1404, changing the unused magazine field 3405 from "( )" to "x", changing the total field 1407 of unused optical disks from "36" to "26" and changing the total field 1408 of the unused magazines from "2" to "1". Finally, the volume increase management means 1210 uses 10 unused optical disks in the storage positions "60, 61, 62, 63, 64, 65, 66, 67, 68, 69" of the volume name "CC" to increase a volume, whereby an operation is completed.

In the embodiment, it is possible that the number of optical disks is input to add capacities to the volume created in each magazine or the number of magazines is input to add capacities to a volume which is not created in each magazine. However, in either case, it is impossible to extract the volume in each magazine.

When the number of magazines (Y:positive integer) is input to increase the volume, the construction described above allows the increased volume to be a manageable one by extracting the same in each magazine, by selecting 10×Y optical disks stored in the Y magazines to increase the volume.

[Embodiment 12]

A description is given of an embodiment 12 according to the twelfth aspect of the present invention, referring to FIGS. 9, 10, 11. In this embodiment 12, when unused magazines to increase a volume is less in number than required, after inquiring of the volume management means 1203 the movement destination storage position information and movement origin storage position information and moving optical disks to create required unused magazines, the volume is increased.

A description is given of an operation of adding 3 magazines to a volume "CC" as an example of a case where the optical disk changer 1100 receives the number of magazines more than the number of currently unused magazines to add capacities to the existing volume. Assume that the optical disk changer 1100 is in the state illustrated in FIGS. 10 and 11, that is, the number of currently unused magazines is 2.

When adding capacities to a volume consisting of optical disks storing system files and not to be extracted in each magazine, the user inputs a volume name and the number of optical disks for adding capacities to the volume to a volume increase information input/output means 1209. At this time, the user inputs "DD" as the volume name and "3" as the number of magazines to the volume increase information input/output means 1209. Thereafter, the volume creation information input/output means 1201 outputs the "DD" and the "3" to a volume creation management means 1202. The volume creation management means 1202 inquires of the volume management means the numbers of unused optical disks and unused magazines. Thereafter, the number of magazines more than currently unused magazines is received to create the volume as in the embodiment 2, thereby unused magazines are created.

An operation after creating the unused magazines is identical to that as in the embodiment 11 in which the number of magazines is received to add capacities to the existing volume. The number of optical disks is received to add capacities to the existing volume and the number of magazines not more than the number of currently unused magazines is received to create a volume as in the operation of the embodiment 11.

The construction described above allows the following. When there are no unused magazines of required number to increase the volume, unused optical disks dispersed into magazines other than unused magazines are gathered to create unused magazines, thereby meeting the user's demand. As a result, all unused optical disks are used optimally to increase the volume irrespective of arrangement of unused optical disks in the optical disk changer.

[Embodiment 13]

A description is given of an embodiment 13 according to the thirteenth aspect of the present invention, referring to FIGS. 9, 10, 29, 30. In this embodiment 13, when the number X (X:positive integer) is input from the volume increase information input/output means as the number of optical disks, unused optical disks stored in magazines storing optical disks constituting the existing volume are selected with priority and outputs the storage position information to the volume increase management means as the storage position information of optical disks to add capacities to the volume.

A description is given of an operation of adding 9 optical disks to the volume "BB" as an example of a case where the number of optical disks is received to add capacities to tho existing volume. Assume that the optical disk changer 1100 is in the state illustrated in FIGS. 10 and 11. The user inputs the volume name and the number of optical disks for adding capacities to the volume to the volume increase information input/output means 1209. The user inputs "BB" as the volume name and "9" as the number of optical disks to the volume increase input/output means 1209.

The volume increase information input/output means 1209 outputs the "BB" as the volume name and the "9" as the number of optical disks to the volume increase management means 1210. The volume increase management means 1210 inquires of the volume management means 1203 the storage position information of 9 unused optical disks and outputs the volume name "BB" to the same. The volume management means 1203 outputs the storage position information of required number of unused optical disks to the volume increase management means 1210, referring to the optical disk management table 1400. The volume management means 1203 conducts retrieval of unused optical disks in accordance with the following algorithm.

First, select magazines storing unused optical disks among magazines storing optical disks constituting the volume for which capacities are to be added. Next, extract the storage position information of required number of unused optical disks from the storage position field 1404 in a magazine of the smallest slot number among the selected magazines, in the ascending order of numbers. If it is less in number than required, select a magazine of the second smallest slot number among the selected magazines to repeat the same operation. If it is less in number than required after repeating the same operation for every selected magazines retrieve unused optical disks in accordance with the unused optical disk retrieval algorithm.

In this case, the magazine slot numbers of the magazine storing optical disks constituting the volume "BB" are "2, 3". The magazine of the magazine slot number "3" stores 6 unused optical disks and the magazine of the magazine slot number "2" stores 0 unused optical disk. Therefore, unused optical disks in the storage positions "34, 35, 36, 37, 38, 39" are selected. For the remaining 3, unused optical disks in the storage positions "15, 16, 17" are selected as in the embodiment 1.

The volume management means 1203 outputs "34, 35, 36, 37, 38, 39, 15, 16, 17" as the storage position information of 9 unused optical disks to the volume increase management means 1210 and changes the volume management table 1300 in FIG. 10 and unused optical disk management table 1400 in FIG. 11 to ones illustrated in FIGS. 29 and 30, respectively. That is, the volume management means performs a series of operations of changing the volume name field 1301 in the storage position field 1301 "34, 35, 36, 37, 38, 39, 15, 16, 17" in the volume management table 1300 in FIG. 10 from "unused" to "BB", changing the unused optical disk number field 1403 of the slot number field 1401 "1" in the unused optical disk management table 1400 in FIG. 11 "5" to "2", deleting "15, 16, 17" in the storage position field 1404, changing the unused optical disk number field 1403 of the slot number field 1401 "3" from "6" to "0", deleting "34, 35, 36, 37, 38, 39" in the storage position field 1404 and changing the total field 1407 of unused optical disks from "36" to "27".

Finally, the volume increase management means 1210 uses 9 unused optical disks in the storage positions "34, 35, 36, 37, 38, 39, 15, 16, 17" of the volume name "BB" to increase the volume, whereby the operation is completed. The number of magazines is received to add capacities to the existing volume as in the embodiment 11.

To add capacities to the volume consisting of 10×Z pieces of optical disks stored in magazines more than Z in the construction described-above, when unused optical disks are stored in a magazine constituting the volume, they are used with priority to add capacities, resulting in addition of capacities without dispersing the storage positions of optical disks. When 5 optical disks constituting one volume are stored in a magazine and other 5 optical disks stored in the magazine are unused ones, 5 optical disks are used to increase the volume, resulting in the volume consisting of ten optical disks stored in one magazine. The volume can be a manageable one by extracting the same in each magazine.

[Embodiment 14]

A description is given of an embodiment 14 according to the 14 the aspect of the present invention referring to FIGS. 4 and 10. In this embodiment 14, the optical disk changer system comprises an unused magazine information display means for inquiring of the volume management means the number of unused magazines and displaying the same, to create the volume in addition to the components of the optical disk changer management apparatus in the embodiment 1 or 2.

A description is given of a case where the number of optical disks is received to create a volume. Assume that the optical disk changer 1100 is in the state illustrated in FIGS. 10 and 11. The user inputs the number of optical disks to the volume creation information input/output means 1201 to create the volume. The volume creation information input/output means 1201 inquires of the volume management means the number of currently unused optical disks to display the same.

The volume management means 1203 conducts retrieval of the total field 1407 of unused optical disks in the unused optical disk management table 1400 in FIG. 11 to output the total number 36 of unused optical disks to the volume creation information input/output means 1201. The volume creation information input/output means 1201 indicates that the number of currently unused optical disks is 36 to the user. Specifically, possible methods includes inputting the display signal output from the volume creation information input/output means 1201 to a display or liquid displaying the same using a dedicated user interface.

After checking the number of unused optical disks, the user inputs the volume name and the number of optical disks. The following operation is similar to that already described in the embodiment 1 where the number of optical disks are received to create the volume.

A description is given of a case where the user inputs the number of magazines to the volume creation information input/output means 1201 to create the volume. The volume creation information input/output means 1201 inquires of the volume management means 1203 the number of currently unused magazines to display the same for the user. The volume management means 1203 conducts retrieval of the total field 1408 of unused magazines in the unused optical disk management table 1400 in FIG. 11 to output the total number "2" of unused magazines to the volume creation information input/output means 1201. The volume creation information input/output means 1201 indicates that the number of currently unused magazines are 3 to the user.

After checking the number of unused magazines, the user inputs the volume name and the number of magazines. The following operation to create the volume is similar to that already described in the embodiment 1 where the number of magazines is received to create the volume.

In the volume management apparatus according to the embodiment 2, when the number of magazines is received to create the volume, the volume creation information input/output means 1201 can display a quotient of the total number of unused optical disks divided by 10 as the number of magazines.

The construction described above allows the user to select the number of optical disks constituting a volume to be created or magazines with ease by displaying the largest number of creatable optical disks or magazines when the user demands creation of the volume.

[Embodiment 15]

A description is given of an embodiment 15 according to the fifteenth aspect of the present invention referring to FIGS. 9, 10. In the embodiment 14, the largest number of creatable optical disks or magazines is displayed when creation of a volume is demanded, while in the embodiment 15, the largest number of creatable optical disks or magazines is displayed when capacities are added to the existing volume.

A description is given of a case where the number of optical disks is received to add capacities to the existing volume. Assume that the optical disk changer 1100 is in the state illustrated in FIGS. 10 and 11. The user inputs the number of optical disks to the volume increase information input/output means 1209 to add capacities to the existing volume. The volume increase information input/output means 1209 inquires of the volume management means 1203 the number of currently unused optical disks to display the same for the user. The volume management means 1203 conducts retrieval of the total field 1407 of unused optical disks in the unused optical disk management table 1400 in FIG. 11 to output the total number "36" of unused optical disks to the volume increase information input/output means 1209. The volume increase information input/output means 1209 indicates that the number of currently unused optical disks is 36 to the user.

After checking the number of unused optical disks, the user inputs the existing volume name and the number of optical disks. The following operation to create the volume is similar to that already described in the embodiment 11 where the number of optical disks is received to add capacities to the existing volume.

A description is given of a case where the number of magazines is received to add capacities to the existing volume. Assume that the optical disk changer 1100 is in the state illustrated in FIGS. 10 and 11. The user inputs tho number of magazines to the volume increase information input/output means 1209 to add capacities to the existing volume. The volume increase information input/output means 1209 inquires of the volume management means 1203 the number of currently unused magazines to display the same for the user. The volume management means 1203 conducts retrieval of the total field 1408 of unused magazines in the unused optical disk management table 1400 in FIG. 11 to output the total number "2" of unused magazines to the volume increase information input/output means 1209. The volume increase information input/output means 1209 indicates that the number of currently unused magazines is 2 to the user.

After checking the number of unused magazines, the user inputs the existing volume name and the number of magazines. The following operation to create the volume is similar to that already described in the embodiment 11 where the number of magazines is received to add capacities to the existing volume.

In the optical disk changer management apparatus illustrated in the embodiment 12, when the number of magazines is received to add capacities to the existing volume, the volume creation information input/output means 1201 can display a quotient of the total number of unused optical disks divided by 10 as the number of magazines.

The construction described above allows the user to select the number of optical disks or magazines for adding capacities to the volume by displaying the largest number of optical disks or magazines for adding capacities when the user demands addition of the volume.

[Embodiment 16]

A description is given of an embodiment 16 according to the sixteenth aspect of the present invention referring to FIGS. 6, 10. In this embodiment 16, when the user demands extraction of a volume, a volume name is received to inform the user of the numbers and locations of magazines corresponding to the volume to be extracted.

A description is given of an operation of extracting a volume "CC" consisting of 20 optical disks stored in 2 magazines as an example of a case where the volume consisting of 10×Z (Z: positive integer) pieces of optical disks stored in Z pieces of magazines is extracted. Assume that the optical disk changer 1100 is in the state illustrated in FIGS. 10 and 11.

The volume information input/output means 1205 which received the extraction request of the volume name "CC" outputs the volume name "CC" to the volume extraction control means 1206. The volume extraction control means 1206 inquires of the volume management means 1203 the numbers of optical disks constituting the volume name "CC" and magazines storing the optical disks, and the magazine slot number.

The volume management means 1203 conducts retrieval of the storage positions and the number of optical disks corresponding to the volume name, the slot number and the number of magazines storing the optical disks in accordance with the volume retrieval algorithm illustrated in the embodiment 5. In this case, the storage positions, the number of optical disks, magazine slot number and the number of magazines, of the volume name "CC" are "40, 41, 42, 43, 44, 45, 46, 47, 48, 49" and "50, 51, 52, 53, 54, 55, 56, 57, 58, 59", "20", "4, 5" and "2", respectively.

The volume management means 1203 which found the numbers of optical disks constituting the volume name "CC" and magazines storing the optical disks outputs "20" as the number of optical disks and "2" as the number of magazines to the volume extraction control means 1206.

The volume extraction control means 1206 checks whether the number of optical disk is 10×Z (Z: positive integer) and the number of magazines is Z or not. The volume extraction control means 1206 permits extraction of the optical disks constituting the volume name "CC" in each magazine and displays the magazine slot number "4, 5" of magazines storing the optical disks.

A volume consisting of 10×Z pieces of optical disks dispersed into magazines more than Z is extracted as in the embodiment 6 illustrated in the embodiment 6.

The volume management apparatus illustrated in the embodiment 7, can inform the user of permission to extract the volume name and display the magazine slot number of the magazine storing the optical disks constituting the volume.

Similarly, in the embodiments 8, 9, 10, the user is informed of permission to extract the volume name and the magazine slot number of the magazine storing optical disks constituting the volume can be displayed.

The construction described above allows the user to identify the magazine to be extracted with ease by informing the user of the number and the location of the magazines to be extracted when the user demands extraction of the volume.

Further, the number of magazines and the storage positions of optical disks for the volumes which can be extracted in each magazine can be displayed when the user demands extraction of the volume. In this case, the user checks the volume names, the number of magazines corresponding to the volume names and the storage positions of optical disks, which can be extracted in each magazine to select the volume name with ease.

In each embodiment, the optical disk 1006 has one face structure. Alternatively, the disk may have two face structure. In this case, one of two faces corresponds to one optical disk with one face structure and the volume creation information input/output means 1201 can receive inputs of the number of faces of optical disks. At this time, the two faces of the optical disk must be moved simultaneously.

A description is given of embodiments 17 to 19 of the present invention.

Figure 31A:
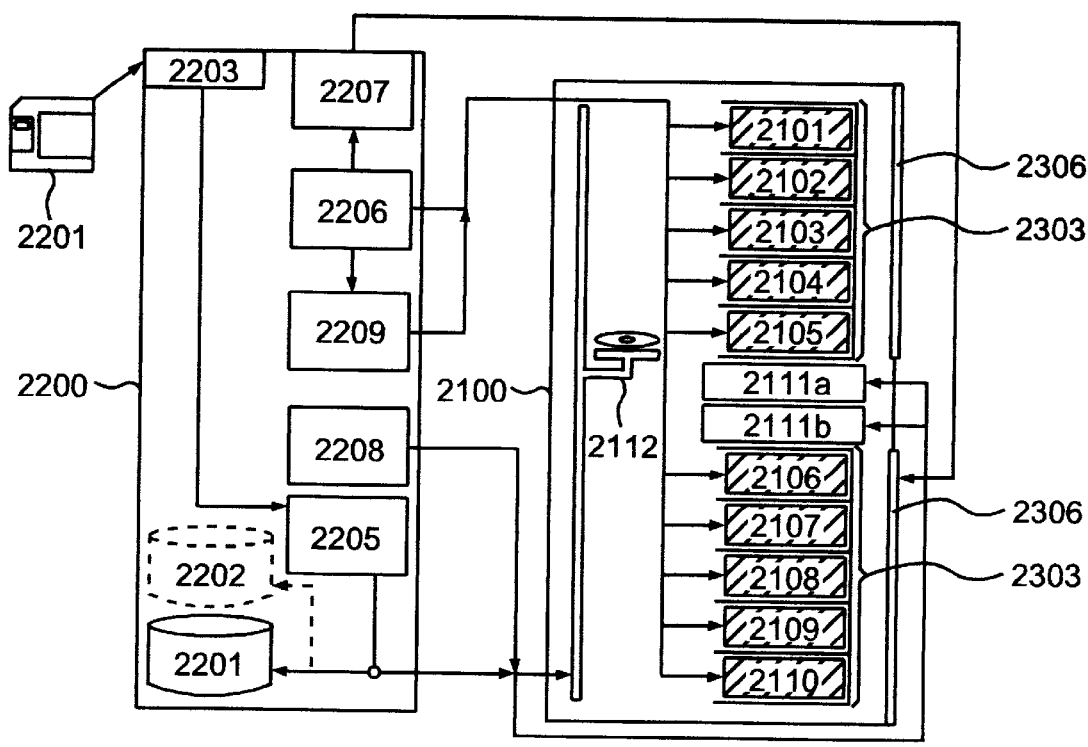
FIGS. 31(a) and 31(b) are diagrams illustrating a construction of the optical disk changer system according to the embodiments 17, 18.
Figure 31B:
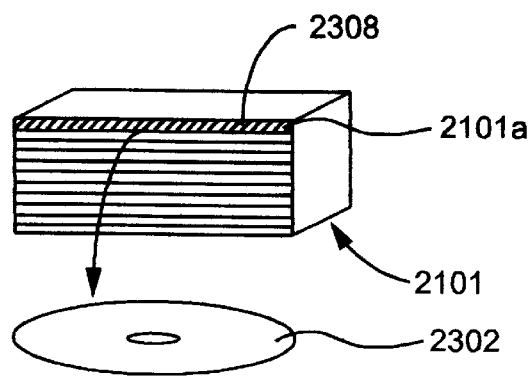

FIG. 31(a) is a view illustrating a construction of the optical disk changer management apparatus according to the embodiments 17 and 18. FIG. 31(b) is an enlarged view illustrating a construction of the top magazine in the storage rack in the optical disk changer. In FIG. 31, reference numeral 2100 designates the optical disk changer. Reference numerals 2101–2110 designate magazines having the storage positions for storing ten optical disks. Reference characters 2111a, 211b designate optical disk drives for writing/reading data of the optical disks. Reference numeral 2112 designates an arm for extracting and moving optical disks in each magazine. Reference numeral 2303 designates a storage rack for storing a plurality of magazines. Reference numeral 2306 designates a door for extracting the optical disks from the optical disk changer 2100.

Reference numeral 2200 designates an optical disk changer management apparatus. Reference numerals 2201 and 2202 designate HDD (hard disk drive). In the HDDs 2201, 2202, system information required to operate the optical disk changer 2100 and the optical disk changer management apparatus 2200 is recorded. Reference numeral 2203 designates a floppy disk drive. Reference numeral 2204 designates a floppy disk for temporary operation. Reference numeral 2205 designates a temporary operating means. The temporary operating means 2205 checks the floppy disk drive 2203 on application of the power to the optical disk changer management apparatus 2200. When there is the floppy disk for temporary operation 2204 in the floppy disk drive 2203, the temporary operating means 2205 inserts optical disk for backup in a specified storage position, i.e., system information storage position (for example, the top optical disk storage position 2308 in the top magazine 2101 ) into either the optical disk drive 2111a or 2111b to operate the system based on the system information recorded in the optical disks for backup. When there is nothing in the floppy disk drive or a floppy disk other than the floppy disk for temporary operation, the system is operated based on the system information recorded in the HDDs 2201, 2202. The former method is for temporary operation when failures occurs in the HDDs 2201, 2202.

Reference numeral 2206 designates a volume management means for managing the storage position information of the volume consisting of optical disks and about unused optical disks included in each magazine in the optical disk changer. The volume management means 2206 always manages information of usage state of all optical disks in magazines 2101–2110 as illustrated in FIGS. 32, 33, 34 and 35. Reference numeral 2207 designates a volume extraction permitting means. When the system receives an instruction of extraction of the magazine from the user, the volume extraction permitting means 2207 inquires of the volume management means 2206 about it and permits extraction of magazines if optical disks in a specified magazine constitutes the same volume. Take an example of a case where magazines in the optical disk changer are in the state illustrated In FIG. 32. In FIG. 32, with respect to magazines 2102, 2104, 2105, all optical disks in one magazine constitute the same volume. The volume extraction permitting means 2207 permits extraction of magazines, 2102, 2104 and 2105. Reference numeral 2208 designates a backup means. The backup means 2208 inserts optical disks in the system information storage position 2308 into a drive 2111a or 2111b to backup system information recorded in the HDDs 2201, 2202 for the optical disks. Information for temporarily operating the system is written to the floppy disk inserted into the floppy disk drive 2203 by the user to create the floppy disk for temporary operation 2204.

[Embodiment 17]

A description is given of an embodiment 17 of the present invention. In this embodiment 17, assume that the optical disk changer management apparatus has only one HDD 2201 as the HDD and a storage capacity of the system information recorded in the drive 2201 does not exceed a storage capacity of one optical disk stored in the optical disk changer 2100. That is, one optical disk is used to create the optical disk for backup. Assume that the top storage position 2308 of the top magazine 2101 (the top position of the magazine 2101 illustrated in FIGS. 32, 33(a), 33(b), 34(a), 34(b)) is employed as the system information storage position.

Reference numeral 2209 designates an optical disk exchange means. When the optical disk changer management apparatus 2208 receives an instruction to create the backup, the optical disk exchange means 2209 inquires of the volume management means 2206 to obtain information of current usage state in the optical disk changer 2100. Thereafter, the backup means 2208 prepares for an operation.

When an optical disk 2101a in the system information storage position of a back up magazine (a magazine including a system information storage position 2308 ) is an unused one as illustrated in FIG. 32, the optical disk exchange means 2209 performs nothing for the same.

When an optical disk in the system information storage position is not an unused one and all optical disk in the backup magazine does not constitute the same volume, the volume extraction permitting means 2207 does not permit extraction of the backup magazine 2101. If optical disks stored in the system information storage position are replaced with unused optical disks in another storage position to create optical disks for backup, the volume extraction permitting means 2207 does not permit extraction of the backup magazine 2101. The optical disk exchange means 2209 exchanges optical disks stored in the system information storage positions for unused optical disks in another storage position.

For example, the optical disk exchange means 2209 exchanges the unused optical disk in the storage position 59 of the magazine 2106 and an optical disk (the storage position 1 ) in the system information storage position 2308. The result of exchange is illustrated in FIG. 33(b).

When optical disks in the system information storage positions are not unused one and all optical disks in the backup magazine constitute the same volume as illustrated in FIG. 34(a), the volume extraction permitting means 2207 permits extraction of the backup magazine 2101, before creation of optical disks for backup.

However, when optical disks included in the system information storage positions are exchanged for unused optical disks to create optical disks for backup, the volume extraction permitting means 2207 does not permit extraction of a volume A of remaining 9 disks included in the backup magazine 2101. To avoid this problem, the optical disk exchange means 2209 exchanges all optical disks included in magazines comprising unused optical disks for all optical disks included in the backup magazine 2101. At this time, unused optical disks are stored in the system information storage positions.

For example, when the magazine 2106 including 2 unused optical disks is exchanged for the backup magazine 2101, in FIG. 34(a), the result of the exchange is illustrated in FIG. 34(b). The backup magazine 2106 is specified to extract the volume A illustrated in FIG. 34(b).

After the operation, the backup means 2208 creates optical disks for backup using unused optical disks stored in the system information storage positions.

The optical disk changer management apparatus 2200 comprising the optical disk exchange means 2209 can create optical disks for backup, when all optical disks constitute the same volume in the backup magazine, irrespective of the usage state of optical disks in the system information storage positions in the backup magazine.

[Embodiment 18]

A detailed description is given of the optical disk changer management apparatus according to the embodiment 18. In this embodiment 18, assume that HDDs 2201, 2202 are used and storage capacities of system information recorded in the HDDs 2201, 2202 does not exceed the storage capacities of 2 optical disks stored in the optical disk changer 2100. That is, 2 optical disks are used for creating optical disks for backup. Assume that the first and second storage positions from the top of the top magazine 2101 (the first and second positions of the magazine 2101 in FIG. 32) are employed.

The optical disk exchange means 2209 prepares for the operation of the backup means 2208 as in the embodiment 1. When the backup magazine 2101 stores unused optical disks in the system information storage positions, the optical disk exchange means 2209 performs nothing for the same.

A description is given of a case where the backup magazine 2101 stores one optical disk is in use in the system information storage position. In this case, assume that an optical disk in the storage position 2 is not unused one, and vice versa. Since the backup magazine does not constitute the same volume, the same operation is performed for the optical disk stored in the storage position 2 as in the embodiment 17 where optical disks in the system information storage positions are not unused ones and do not constitute the same volume. The optical disk exchange means 2209 exchanges optical disks stored in the storage position 2 for unused optical disks in another storage positions. For example, an unused optical disk in the storage position 59 is exchanged for an optical disk in the storage position 2 of the magazine 2106 in FIG. 35(a). The result of the exchange is illustrated in FIG. 35(b).

If optical disks in the system information storage positions are not unused ones, two ways are possible. One is that optical disks in the backup magazine do not constitute the same volume as illustrated in FIG. 36(a). The other is that optical disks in the backup magazine constitute the same volume as illustrated in FIG. 37(a). In the former case, the same operation is performed for the optical disks in the storage positions 1, 2 as in the embodiment 17 where optical disks in the system information storage positions are unused ones and do not constitute the same volume. The optical disk exchange means 2209 exchanges optical disks stored in the storage positions 1, 2 for unused optical disks in another storage positions. For example, unused optical disks in the storage position 59, 60 are exchanged for optical disks in the storage positions 1, 2 of the magazine 2106 in FIG. 36(a). The result of the exchange is illustrated in FIG. 36(b).

In the case illustrated in FIG. 37(a), the same operation is performed for the backup magazine as in the embodiment 17 where optical disks in the system information storage positions are not unused ones and constitute the same volume the optical disk exchange means 2209 exchanges optical disks stored in the magazine including 2 unused optical disks for optical disks included in the backup magazine 2101. At this time unused optical disks must be stored In the system information storage position. For example, optical disks are exchanged between the magazine 2106 including 2 unused optical disks and the backup magazine 2101. The result of the exchange is illustrated in FIG. 37(h).

The operation in a case where optical disks in the system information storage position are not unused ones and there are no magazines including 2 unused optical disks is as follows.

For example, when there are no magazines including 2 unused optical disks, one unused optical disk included in the magazine 2107 is exchanged for one optical disk in use in the magazine 2107, resulting in the state illustrated in FIG. 38(b). Thereafter, all optical disks are exchanged between the backup magazine 2106 and the backup magazine 2101. The result of the exchange is illustrated in FIG. 38(c).

After the operation, the backup means 2208 uses unused optical disks stored in the system information storage positions to create optical disks for backup.

The optical disk changer management apparatus 2200 with the optical disk exchange means 2209 can create optical disks for backup when all optical disks in the backup magazine constitute the same volume, irrespective of the usage state of optical disks in a plurality of system information storage positions in the backup magazine 2101.

[Embodiment 19]

Figure 39:
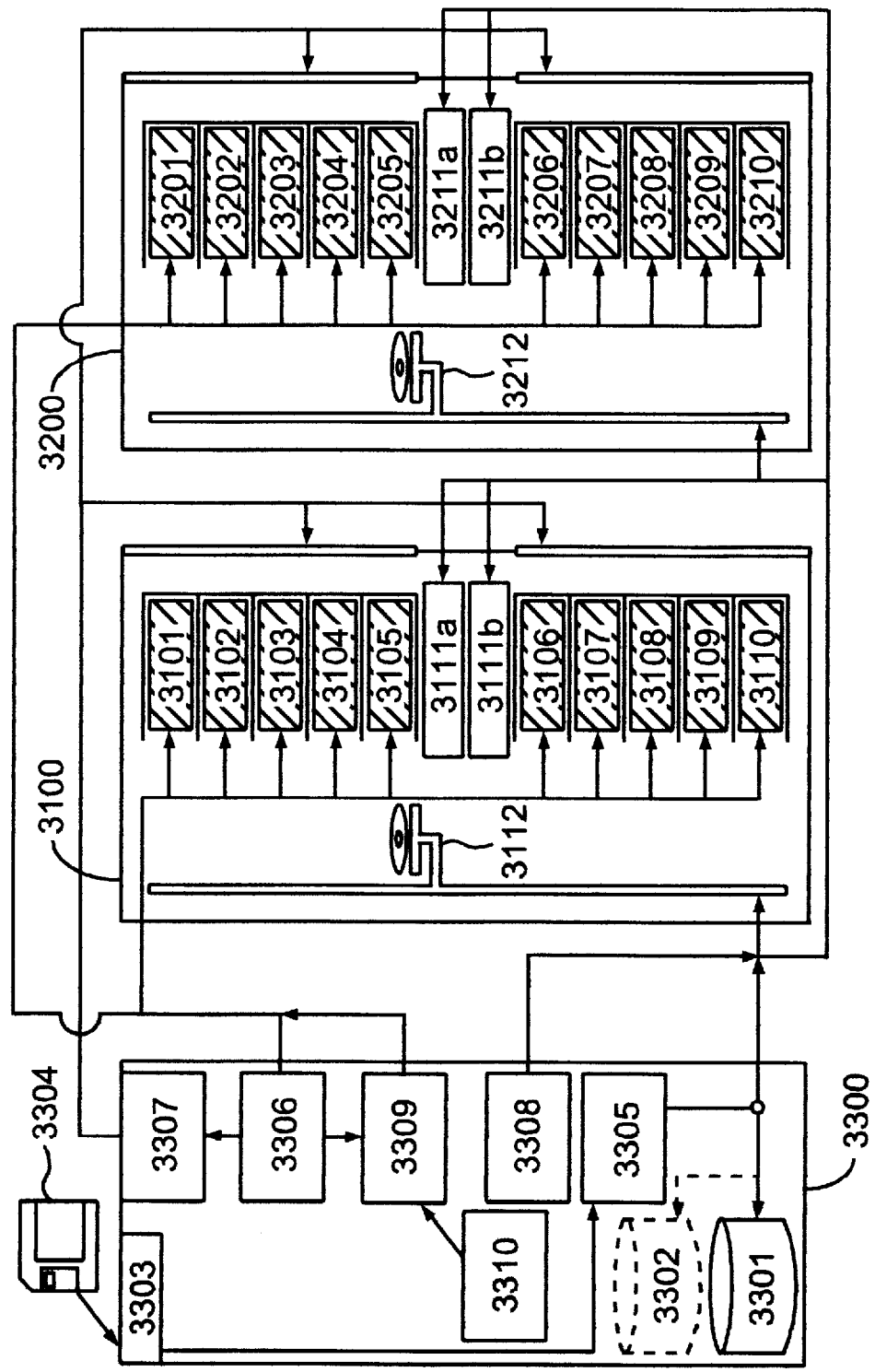
FIG. 39 is a diagram of a construction illustrating the optical disk changer system in an embodiment 19.

A detailed description is given of an optical disk changer management apparatus according to the embodiment 19. In FIG. 39, reference numerals 3100, 3200 designate the same optical disk changer 2100 illustrated in FIG. 31(a). Reference numerals 3101–3110, 3201–3210 designate magazines. Reference characters 3111a, 3111b, 3211a, 3211b designate optical disk drives. Reference numerals 3112, 3212 designate arms.

Reference numeral 3300 designates the optical disk changer management apparatus which controls the optical disk changers 3100, 3200. 3301, 3302 designate HDDs. 3303 designates a floppy disk drive. 3304 designates a floppy disk for temporary operation. 3305 designates a temporary operating means. 3306 designates a volume management means. 3307 designates a volume extraction permitting means. 3308 designates a backup means. Each means described-above has the same function as each part corresponding to the same in FIG. 31(a).

In this embodiment, assume that HDDs 3301, 3302 are used and storage capacities of system information recorded in the HDDs 3301, 3302 does not exceed storage capacities of 2 optical disks stored in the optical disk changers 3100, 3200. That is, 2 optical disk are used for creating optical disks for backup. One of the system information storage positions is at the top of the magazine 3101 stored at the top of the optical disk changer 3100.

Reference numeral 3310 designates a system information storage position selecting means. The user selects the other system information position either in the second position from the top of the magazine 3101 or in the top position of the magazine 3201 stored at the top of the optical disk changer 3100.

When the other system information storage position in the second position from the top of the magazine 3101 is selected, the optical disk exchange means 3309 performs exchange of optical disks as required according to the method in the embodiment 2 with respect to the optical dusk changer 3100.

When the other system information storage position at the top of the magazine 3201 is selected, the optical disk exchange 3309 performs exchange of optical disks as required according to the method described in the embodiment 17 with respect to the optical disk changers 3100, 3200, respectively.

After the operation, the backup means 3308 uses unused optical disks stored in the system information storage position to create optical disks for backup.

In the optical disk changer management apparatus 3300 including the optical disk exchange means 3309 and the system storage position selecting means 3310, required system information storage position can be selected among the system information storage positions of a plurality of optical disks.

What is claimed is:

1. An optical disk changer system comprising:
   an optical disk changer including M magazines storing N optical disks (N, M: positive integers), where optical disks are inserted/extracted in each magazine and for managing data on a set of optical disks consisting of one or a plurality of optical disks as a volume having a series of logical addresses;
   a volume management means including a volume management table for managing storage position information of optical disks constituting each volume and storage position information of unused optical disks and an unused optical disk management table for identifying storage position information of unused optical disks stored in each magazine and unused magazines storing N unused optical disks;
   a volume creation information input means for receiving inputs of the number of optical disks or magazines to create the volume, and
   a volume creation management means,
   inquiring of the volume management means the storage position information of X unused optical disks to create a volume consisting of X optical disks when a positive integer X is input from the volume creation information input means as the number of the optical disks, and inquiring of the volume management means storage position information of N×Z pieces of unused optical disks stored in Z pieces of unused magazines to create a volume consisting of N×Z pieces of optical disks stored in Z pieces of magazines, according to the number of unused magazines when the positive integer Z is input from the volume creation information input means as the number of magazines.

2. The optical disk changer system of claim 1 wherein in the optical disk changer, the optical disks are moved between the magazines, the volume management means computes a total number of the unused magazines and finds movement destination storage position information and movement origin storage position information for gathering unused optical disks dispersed into magazines (magazines in use) other than the unused magazines into one or a plurality of magazines in use, based on management information in the volume management table and the unused optical disk management table, the volume creation management means, inquires of the volume management means the number of unused magazines when the positive integer Z is input from the volume creation information input means as the number of the magazines, inquires of the volume management means N×Z pieces of unused optical disks stored in Z pieces of unused magazines to create a volume consisting of N×Z pieces of optical disks stored in Z pieces of magazines when there are unused magazines not less than Z, and after inquiring of the volume management means the movement destination storage position information and the movement origin storage position information and moving unused optical disks stored in a magazine in use to one or a plurality of another magazines in use to create Z pieces of unused magazines, creates a volume consisting of N×Z pieces of optical disks stored in Z pieces of magazines, when there are unused magazines less than Z.

3. An optical disk changer system comprising:

an optical disk changer including M magazines storing N optical disks (N, M: positive integers), where optical disks can be inserted/extracted in each magazine and are moved between the magazines, and for managing data on a set of optical disks consisting of one or a plurality of optical disks as a volume having a series of logical addresses;

a volume management means including a volume management table for managing storage position information of optical disks constituting each volume and storage position information of unused optical disks and an unused optical disk management table for identifying storage position information of unused optical disks stored in each magazine and unused magazines;

a volume creation information input means for receiving inputs of the number of optical disks to create the volume; and a volume creation management means, the volume creation management means, inquiring of the volume management means storage position information of X unused optical disks to create a volume consisting of X optical disks when the positive integer X is input from the volume creation information input means as the number of the optical disks and X is not N×Z (Z: positive integer), inquiring of the volume management means storage position information of N×Z pieces of unused optical disks stored in Z pieces of unused magazines to create a volume consisting of N×Z pieces of optical disks stored in Z pieces of magazines, according to the number of unused magazines when the X is N×Z.

4. The optical disk changer system of claim 3 wherein:

the volume management means identifies storage position information of unused optical disks stored in each magazine and unused magazines and, computes a total number of the unused magazines and further finds the movement destination storage position information and the movement origin storage position information for gathering unused optical disks dispersed into magazines (magazines in use) other than the unused magazines into one or a plurality of magazines in use, based on management information in the volume management table and the unused optical disk management table, the volume creation management means, inquires of the volume management means the number of unused magazines, when the positive integer X is input from the volume creation information input means as the number of the optical disks and the X is N×Z (Z: positive integer), inquires of the volume management means storage position information of N×Z pieces of unused optical disks stored in Z pieces of unused magazines to create a volume consisting of N×Z pieces of optical disks stored in Z pieces of magazines when there are unused magazines not less than Z, after inquiring of the volume management means the movement destination storage position information and the movement origin storage position information and gathering unused optical disks stored in a magazine in use into one or a plurality of another magazines in use to create Z pieces of unused magazines, creates a volume consisting of N×Z pieces of optical disks stored in Z pieces of magazines, when there are unused magazines less than Z.

5. An optical disk changer system comprising:

an optical disk changer including M magazines storing N optical disks (N, M: positive integers), where optical disks can be inserted/extracted in each magazine and are moved between magazines, and for managing data on a set of optical disks consisting of one or a plurality of optical disks as a volume having a series of logical addresses;

a volume management means including a volume management table for managing storage position information of optical disks constituting each volume and storage position information of unused optical disks, and finding storage position information of optical disks constituting each volume, total numbers of the optical disks and magazines storing the optical disks, and movement destination storage position information and movement origin storage position information for gathering the optical disks constituting each volume dispersed into a plurality of magazines into the fewest magazines, based on the volume management table;

a volume creation information input means for receiving inputs of the number of optical disks to create the volume; and an optical disk relocating means, inquiring of the volume management means the storage position information of X unused optical disks to create a volume consisting of X optical disks when positive integer X is input from the volume creation information input means as the number of the optical disks, and subsequently to this, inquiring of the volume management means the numbers of optical disks constituting each volume and magazines at an arbitrary time to identify a volume consisting of N×Z (Z: positive integer) pieces of optical disks and the magazines more than Z, and inquiring of the volume management means the movement destination storage position information and the movement origin storage position information of optical disks constituting the identified volume to move the optical disks constituting the identified volume to Z pieces of magazines.

6. An optical disk changer system comprising:

an optical disk changer including M magazines storing N optical disks (N, M: positive integers), where optical disks are inserted/extracted in each magazine and for managing data on a set of optical disks consisting of one or a plurality of optical disks as a volume having a series of logical addresses;

a volume management means including a volume management table for managing storage position information of optical disks constituting each volume and storage position information of unused optical disks and computing total numbers of optical disks constituting each volume and magazines storing the optical disks;

a volume name input means for receiving a volume name to extract the volume; and a volume extraction control means for permitting extraction of optical disks constituting the volume in each magazine, after inquiring of the volume management means the numbers of optical disks constituting the volume name and the magazines storing the optical disks therein, when the number of the optical disks is N×Z (Z: positive integer) and the number of the magazines is Z.

7. The optical disk changer system of claim 6 wherein in the optical disk changer, the optical disks are moved between the magazines, the volume management means finds the storage position information of optical disks constituting each volume based on the volume management table, in addition to the total number of the optical disks and the total number of the magazines storing the optical disks, and finds movement destination storage position information and movement origin storage position information for gathering N×Z pieces of optical disks dispersed into L magazines (Z and L: positive integers Z<L) into Z pieces of magazines selected among the L magazines, based on the volume management table, the volume extraction control means, inquires of the volume management means the numbers of the optical disks constituting the volume name and the magazines storing the optical disks therein, permitting extraction of the optical disks constituting the volume in each magazine, when the number of the optical disks is N×Z and the number of the magazines is Z, after inquiring of the volume management means the movement destination storage position information and the movement origin storage position information to move the optical disks to Z pieces of magazines, permits extraction of optical disks constituting the volume in each magazine when the number of the optical disks is N×Z and the number of the magazines is L.

8. An optical disk changer system comprising:

an optical disk changer including M magazines storing N optical disks (N, M: positive integers), where optical disks can be inserted/extracted in each magazine and are moved between the magazines, and for managing data on a set of optical disks consisting of one or a plurality of optical disks as a volume having a series of logical addresses;

an empty magazine inserting means for inserting empty magazines storing no optical disks;

a volume management means including a volume management table for managing storage position information of optical disks constituting each volume, storage position information of unused optical disks and storage position of magazines, and for managing a magazine slot (an empty slot) in which no magazines are inserted and optical disk storage position information corresponding to the empty slot;

a volume name input means for receiving a volume name to extract the volume; and a volume extraction control means, inquiring of the volume management means the storage position information of the optical disks constituting the volume name and the smallest number of magazines for storing the optical disks to insert empty magazines of the same number as the smallest number of magazines by the empty magazine inserting means, after inquiring of the volume management means optical disk storage position information corresponding to the empty slot to move the optical disks constituting the volume to the inserted empty magazines, permitting extraction of the optical disks constituting the volume in each magazine.

9. An optical disk changer system comprising:

an optical disk changer including M magazines storing N optical disks (N, M: positive integers), where optical disks can be inserted/extracted in each magazine and are moved between magazines, and for managing data on a set of optical disks consisting of one or a plurality of optical disks as a volume having a series of logical addresses;

a volume management means including a management table for managing storage position information of optical disks constituting each volume and storage position information of unused optical disks and for finding storage position information of optical disks constituting each volume, the total numbers of the optical disks and of magazines storing the optical disks therein, and movement destination storage position information and movement origin storage position information for moving N×Z (Z: positive integer) pieces of optical disks to Z pieces of magazines, based on the volume management table;

a volume name input means for receiving a volume name to extract the volume; and a volume extraction control means, inquiring of the volume management means the number of optical disks constituting the volume name, inquiring of the volume management means the movement destination storage position information and the movement origin storage position information when the number of the optical disks is N×Z, to move the optical disks to specified Z pieces of magazines, and subsequently to this, permitting extraction of the optical disks constituting the volume in each magazine.

10. The optical disk changer system of claim 9 further comprising a magazine selecting means for selecting magazines in order of taking much time to carry optical disks to an optical disk drive unit in the optical disks changer when selecting the specified Z pieces of magazines.

11. The optical disks changer system of claim 1 further comprising:

a volume increase information input means for receiving an existing volume name and inputs of the number of optical disks or magazines; and a volume increase management means, inquiring of the volume management means the storage position information of X unused optical disks to add X optical disks to the existing volume when positive integer X is input from the volume increase information input means as the number of the optical disks, inquiring of the volume management means storage position information of Z pieces of unused magazines and N×Z pieces of unused optical disks stored therein to add N×Z pieces of optical disks stored in Z pieces of magazines to the existing volume, when positive integer Z is input from the volume increase information input means as the number of the magazines.

12. The optical disk changer system of claim 2 further comprising:

a volume increase information input means for receiving an existing volume name, and the number of optical disks or magazines; and a volume increase management means, inquiring of the volume management means the storage position information of X unused optical disks to add X optical disks to the existing volume when positive integer X is input from the volume increase information input means as the number of the optical disks, inquiring of the volume management means the number of unused magazines when positive integer Z is input from the volume increase information input means as the number of the magazines, inquiring of the volume management means storage position information of Z pieces of unused magazines and N×Z pieces of unused optical disks stored therein to add N×Z pieces of optical disks stored in Z pieces of magazines to the existing volume, when there are unused magazines not less than Z, after inquiring of the volume management means the movement destination storage position information and movement origin storage position information and gathering unused optical disks stored in a magazine in use into one or a plurality of another magazines in use to create Z pieces of unused magazines, adding N×Z pieces of optical disks stored in Z pieces of magazines to the existing volume, when there are unused magazines less than Z.

13. The optical disk changer system of claim 11 wherein the volume management means selects unused optical disks stored in a magazine storing optical disks constituting the existing volume with priority to output the storage position information to the volume increase management means as the optical disk storage position information when positive integer X is input from the volume increase information input means as the number of the optical disks.

14. The optical disks changer system of claim 12 wherein the volume management means selects unused optical disks stored in a magazine storing optical disks constituting the existing volume with priority to output the storage position information to the volume increase management means as the optical disk storage position information when positive integer X is input from the volume increase information input means as the number of the optical disks.

15. The optical disk changer system of claim 1 further comprising:

an unused magazine information display means for inquiring of the volume management means the number of unused magazines to display the same when creating a volume.

16. The optical disk changer system of claim 2 further comprising:

an unused magazine information display means for inquiring of the volume management means the number of unused magazines to display the same when creating a volume.

17. The optical disk changer system of claim 11 further comprising:

an unused magazine information display means for inquiring of the volume management means the number of unused magazines to display the same, before the number of optical disks or magazines is input from the volume increase information input means.

18. The optical disk changer system of claim 12 further comprising:

an unused magazine information display means for inquiring of the volume management means the number of unused magazines to display the same, before the number of optical disks or magazines is input from the volume increase information input means.

19. The optical disk changer system of claim 6 further comprising:

a volume information display means for inquiring of the volume management means position information of a magazine storing the optical disks constituting the volume to display position information of the magazine storing optical disks constituting the volume and extraction information as to whether the optical disks constituting the volume can be extracted in each magazine or not, when extraction of the volume is demanded.

20. The optical disk changer system of claim 7 further comprising:

a volume information display means for inquiring of the volume management means position information of a magazine storing the optical disks constituting the volume to display position information of the magazine storing optical disks constituting the volume and extraction information as to whether the optical disks constituting the volume can be extracted in each magazine or not, when extraction of the volume is demanded.

21. An optical disk changer system comprising:

an optical disk changer including a plurality of magazines storing N (N: positive integer) optical disks;

a volume management means for managing data on a set of optical disks consisting of one or a plurality of optical disks as a volume having a series of logical addresses and for managing storage position information of optical disks consisting of each volume and storage position information of unused optical disks;

a system information storage means for storing system information required to operate the system; and an optical disk exchange means, inquiring of the volume management means the optical disks stored in the system information storage positions in specified magazines in the optical disk changer, inquiring of the volume management means all optical disks stored in a magazine including the system information storage position when the optical disks are not unused ones, exchanging optical disks stored in the system information storage positions for unused optical disks stored in another storage positions when the all optical disks do not constitute the same volume, retrieving a magazine for exchange including unused optical disks to exchange all optical disks in the magazine for exchange for all optical disks in the backup magazine as the specified magazine so that unused optical disks are stored in the system information storage positions when the all optical disks constitute the same volume; and a backup means for performing backup of recording system information in the system information storage means in unused optical disks stored in the system information storage position.

22. The optical disk changer system of claim 21 wherein the optical disk has a storage capacity A (A: positive integer), a total storage capacity of the system information is larger than A×(X-1) and not more than A×X, and X (X: positive integer 2≦X≦N) system information storage positions are in the backup magazine, the optical disk exchange means, inquires of the volume management means to retrieve magazines for exchange including unused optical disks, exchanges all optical disks in the backup magazine for all optical disks in the magazines for exchange so that X unused optical disks in the magazines for exchange are stored in the system information storage positions in the backup magazine, when there are magazines for exchange including X unused optical disks, and moves X unused optical disks to an arbitrary magazine for exchange to exchange all optical disks in the magazine for exchange for all optical disks in the backup magazine so that X unused optical disks are stored in the system information storage positions, when there are no magazines for exchange including X unused optical disks.

23. The optical disk changer system of claim 22 further comprising:

M optical disk changers having X possible system information storage positions respectively, as the optical disk changer; and a system information storage position selecting means for selecting X arbitrary system information storage positions among the M×X system information storage positions.

24. A method of managing an optical disk changer including M magazines storing N optical disks (N, M: positive integers), where optical disks are inserted/extracted in each magazine, and for managing data on a set of optical disks consisting of one or a plurality of optical disks as a volume having a series of logical addresses, using a volume management table for managing storage position information of optical disks constituting each volume and storage position information of unused optical disks, and an unused optical disk management table for identifying storage position information of unused optical disks stored in each magazine and unused magazine storing N unused optical disks; and creating a volume consisting of X optical disks referring to the volume management table, when positive integer X is input from the volume creation information input means for receiving inputs of the number of optical disks or magazines and, creating a volume consisting of N×Z pieces of optical disks stored in Z pieces of magazines based on storage position information of N×Z pieces of unused optical disks stored in Z pieces of unused magazines in the unused optical disk management table, when positive integer Z is input from the volume creation information input means as the number of the magazines.

25. A method of managing an optical disk changer including M magazines storing N optical disks (N, M: positive integers), where optical disks are inserted/extracted in each magazine and can be moved between the magazines, and for managing data on a set of optical disks consisting of one or a plurality of optical disks as a volume having a series of logical addresses;

finding storage position information of optical disks constituting each volume, total numbers of the optical disks and of the magazines storing the optical disks therein, and movement destination storage position information and movement origin storage position information for gathering the optical disks constituting each volume dispersed into a plurality of magazines into the fewest magazines based on the volume management table for managing storage position information of optical disks constituting each volume and storage position information of unused optical disks; and identifying a volume consisting of N×Z (Z: positive integer) pieces of optical disks and magazines more than Z, based on the numbers of optical disks constituting each volume and magazines storing the optical disks therein, to move the optical disks constituting the identified volume to Z pieces of magazines based on the movement destination storage position information and the movement origin storage position information of optical disks constituting the identified volume.

* * * * *